(12) United States Patent
Atkin et al.

(10) Patent No.: US 12,257,548 B2
(45) Date of Patent: Mar. 25, 2025

(54) SYSTEMS AND METHODS FOR WATER PUMPING AND DESALINATION

(71) Applicant: SSJR Water Solutions, LLC, Clifton, ID (US)

(72) Inventors: Joseph Sterling Atkin, Draper, UT (US); Henry Joseph Atkin, Draper, UT (US)

(73) Assignee: SSJR Water Solutions, LLC, Clifton, UT (US)

( * ) Notice: Subject to any disclaimer, the term of this patent is extended or adjusted under 35 U.S.C. 154(b) by 173 days.

(21) Appl. No.: 18/088,154

(22) Filed: Dec. 23, 2022

(65) Prior Publication Data

US 2023/0372869 A1    Nov. 23, 2023

Related U.S. Application Data

(63) Continuation-in-part of application No. 17/748,898, filed on May 19, 2022.

(51) Int. Cl.
*B01D 61/10* (2006.01)
*B01D 61/02* (2006.01)
(Continued)

(52) U.S. Cl.
CPC .......... *B01D 61/10* (2013.01); *B01D 61/025* (2013.01); *C02F 1/441* (2013.01); *F03B 13/1815* (2013.01); *F03B 13/1855* (2013.01); *F03B 13/187* (2013.01); *F03B 13/1875* (2013.01); *F03B 13/188* (2013.01);
(Continued)

(58) Field of Classification Search
CPC ..... Y02E 10/30; Y02A 20/144; Y02A 20/131; F03B 13/187; F03B 13/1815; F03B 13/189; F03B 13/1855; F03B 13/20; F03B 13/1875; F03B 13/188; F04B 43/10; F04B 43/12; F04B 17/00; F04B 43/0072; B01D 61/10; B01D 61/025; B01D 2313/18; B01D 2313/243; C02F 1/441; C02F 2103/08; C02F 2201/005
See application file for complete search history.

(56) References Cited

U.S. PATENT DOCUMENTS 1,128,590 A * 2/1915 Crowe ................ F03B 13/1815
    417/332
3,039,309 A * 6/1962 Vesper ................ F04B 43/1133
    73/864.34
(Continued)

FOREIGN PATENT DOCUMENTS

JP         H08310769 A    11/1996

*Primary Examiner* — Peter J Bertheaud
(74) *Attorney, Agent, or Firm* — Dentons Durham Jones Pinegar; Sarah W. Matthews

(57) ABSTRACT

A system and method for moving water up a water column to achieve a sufficient pressure to overcome a reverse osmosis filter. The system includes a rigid outer column for receiving and holding water, with an inner, deformable hose located inside the rigid outer column. The hose has a one-way valve at a distal end of the hose to allow water to enter the hose and an outlet at the proximal end of the hose to allow water to exit the hose. A water-raising device to raise the water within the inner, deformable can include a system that moves sections of water within an inner lumen using a peristaltic motion to drive water upwardly through the inner lumen.

9 Claims, 40 Drawing Sheets

(51) Int. Cl.
  *C02F 1/44*      (2023.01)
  *C02F 103/08*    (2006.01)
  *F03B 13/18*     (2006.01)
  *F03B 13/20*     (2006.01)
  *F04B 17/00*     (2006.01)
  *F04B 43/00*     (2006.01)
  *F04B 43/10*     (2006.01)
  *F04B 43/12*     (2006.01)

(52) U.S. Cl.
  CPC ............ *F03B 13/189* (2013.01); *F03B 13/20* (2013.01); *F04B 17/00* (2013.01); *F04B 43/0072* (2013.01); *F04B 43/10* (2013.01); *F04B 43/12* (2013.01); *B01D 2313/18* (2013.01); *B01D 2313/243* (2013.01); *C02F 2103/08* (2013.01); *C02F 2201/005* (2013.01); *Y02A 20/144* (2018.01); *Y02E 10/30* (2013.01)

(56) References Cited

U.S. PATENT DOCUMENTS

| | | | |
|---|---|---|---|
| 4,507,093 | A | 3/1985 | Norvell |
| 4,580,952 | A | 4/1986 | Eberle |
| 4,886,432 | A * | 12/1989 | Kimberlin ............... F04B 43/10 417/478 |
| 9,017,042 | B2 | 4/2015 | Frazer |
| 10,626,710 | B1 | 4/2020 | Romero |
| 10,788,011 | B2 | 9/2020 | Suddaby |
| 11,122,785 | B2 | 9/2021 | Greenberg et al. |
| 2011/0081259 | A1 | 4/2011 | Vowles |
| 2015/0093257 | A1 | 4/2015 | Lastra |
| 2017/0260031 | A1 | 9/2017 | Hunt |
| 2020/0339446 | A1 | 10/2020 | Young et al. |

* cited by examiner

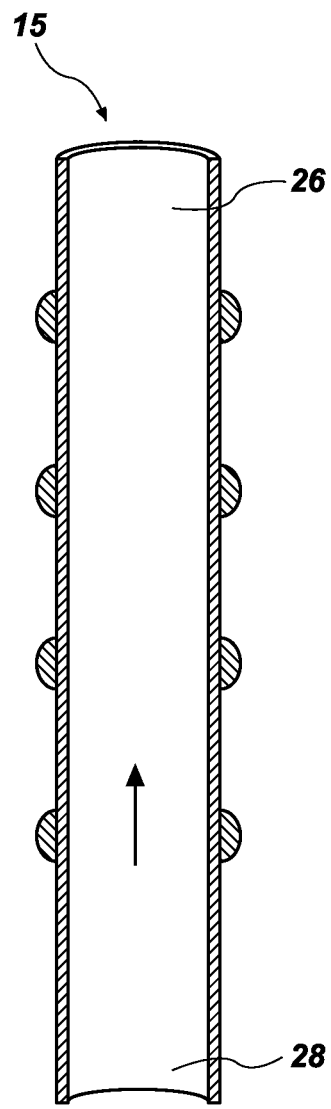
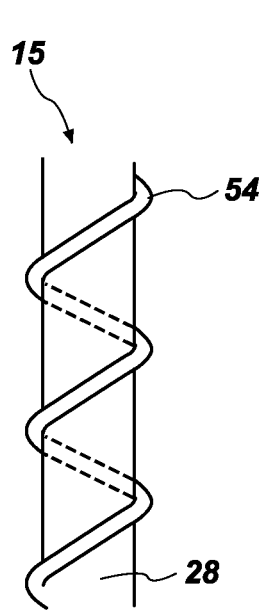
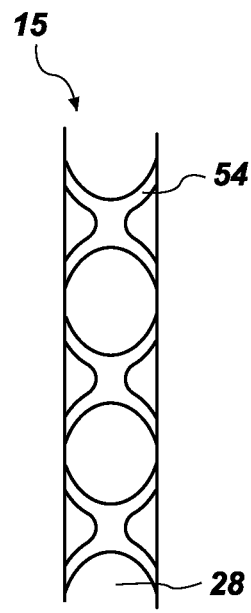
FIG. 8
FIG. 9A  FIG. 9B

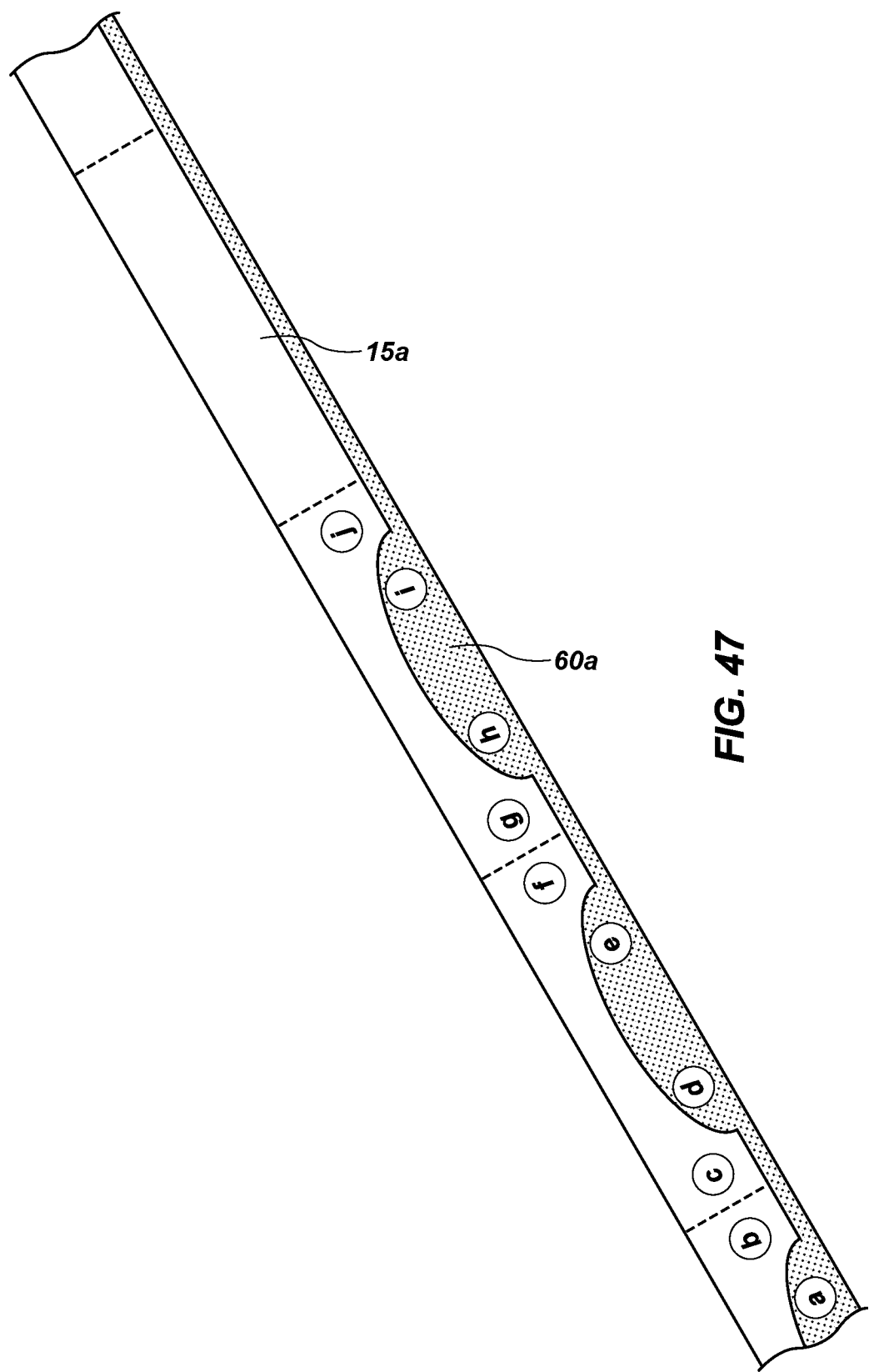

SYSTEMS AND METHODS FOR WATER PUMPING AND DESALINATION

PRIORITY CLAIM

This application is a continuation-in-part of U.S. application Ser. No. 17/748,898, filed 19 May 2022, and the disclosure of which is incorporated herein by reference in its entirety.

TECHNICAL FIELD

The present disclosure relates generally to pumping and desalination systems and methods. More specifically, the disclosure relates to a pump or other system that may be used to raise water up a column to achieve a pressure for desalination, or otherwise use water pressure to achieve a pressure for desalination.

BACKGROUND

Many areas of the world are in a state of drought. This is particularly true for the western United States and desert nations such as Saudi Arabia and the United Arab Emirates. The average American consumes roughly 150 gallons of fresh water per day. Worldwide the demand for freshwater is increasing 169 billion gallons per year. As of 25 Jan. 2022, the United States Drought Monitor estimates over 51,000,000 individuals are living in an area of exceptional drought in the Western United States alone.

Desalination of ocean water is a proposed solution to current drought issues. A primary problem with a desalinization process is the movement of the water from the ocean to a processing plant on land, and then from the processing plant to the users who need the clean water. A common desalination process involves a reverse osmosis filter. Reverse osmosis filters require a high water pressure. However, creating the high pressure needed to push water across the membrane is expensive, and has a very high electricity consumption. Electrically powered pumps are typically used to develop the high water pressure. These pumps use a substantial amount of electricity, and often multiple pumps are needed.

SUMMARY OF DISCLOSURE

A system for moving water up a water column can include: a rigid outer column for receiving and holding water; an inner, deformable hose located inside the rigid outer column, the hose having a one-way valve at a distal end of the hose to allow water to enter the hose and an outlet at the proximal end of the hose to allow water to exit the hose; a water-raising device for raising water within the inner, deformable hose, the water-raising device comprising at least one roller to selectively clamp the inner, deformable hose and move along the inner, deformable hose, and a selectively inflatable buoyancy support attached to the at least one roller, the selectively inflatable buoyancy support to raise the roller clamp along the inner, deformable hose.

According to another aspect, the inner, deformable hose has a first, rigid position for filling the inner, deformable hose, and a second, flaccid configuration for moving water within the inner, deformable hose up the hose. In some configurations, the inner, deformable hose comprises one or more selectively fillable air channels and the first, rigid position is achieved by filling the one or more selectively fillable air channels with air and wherein the second, flaccid configuration is achieved by removing air from the one or more selectively fillable air channels. In other configurations, the inner, deformable hose comprises one or more selectively fillable water channels and the first, rigid position is achieved by filling the one or more selectively fillable water channels with water and wherein the second, flaccid configuration is achieved by removing water from the one or more selectively fillable water channels.

According to yet another aspect, the inner, deformable hose is formed of both resilient and flexible material. In some configurations, a one-way valve at the outlet allows water to exit the hose. In some examples the outlet comprises an effluent pipe. The effluent pipe can be in fluid communication with a reverse osmosis water filter.

In some configurations, the water-raising device for raising water within the inner, deformable hose raises the water to a predetermined height, and wherein the predetermined height of the water creates a water column to be filtered with the predetermined height, the water column to be filtered having sufficient pressure at the bottom of the water column to be filtered to overcome a reverse osmosis filter.

In some examples, the water-raising device comprises a first roller clamp and a second roller clamp, the first roller clamp and the second roller clamp mounted on a roller clamp frame, the first roller clamp and second roller clamp having a first, open position in which the first roller clamp is located towards a first outer edge of the roller clamp frame and the second roller clamp is located towards a second outer edge of the roller clamp frame, and wherein the first roller clamp and the second roller clamp have a second, closed position in which the first roller clamp and the second roller clamp are located towards a middle of the roller clamp frame. The roller clamp frame can be in connection with the selectively inflatable buoyancy support.

According to another aspect, a system for moving water up a water column, the system comprising: a rigid outer column for receiving and holding water; an inner, deformable hose located inside the rigid outer column, the inner, deformable hose having a one-way valve at a distal end of the hose to allow water to enter the hose and an outlet at the proximal end of the hose to allow water to exit the hose; a water-raising device for raising water within the inner, deformable hose.

BRIEF DESCRIPTION OF DRAWINGS

The drawings are illustrative and not limiting of the scope of the invention which is defined by the appended claims. Not every element of the disclosure can be clearly displayed in a single drawing, and as such not every drawing shows each element of the disclosure. The components in the drawings are not necessarily to scale relative to each other. Like reference numerals designate corresponding parts throughout the several views.

FIG. 8 is a cross-sectional view of an exemplary inner hose that can be used with the water pumping system.

FIG. 9A is a side view of another exemplary inner hose that can be used with the water pumping system.

FIG. 9B is a side view of another exemplary inner hose that can be used with the water pumping system.

FIGS. 41-47 illustrate embodiments of a deformable hose having selectively inflatable and deflatable chambers to create a peristaltic motion to drive water upwardly through the deformable hose.

DETAILED DESCRIPTION

The present disclosure relates generally to a system and device for moving water vertically (such as up a column) or generally vertically to achieve a higher water pressure. The systems herein are generally referred to as "water pumping" systems, although many of the exemplary systems do not contain a traditional pump. "Water pumping systems," therefore, mean any system that, overall, moves water against gravity (such systems can contain portions of the system that allow water to move with the forces of gravity).

As used herein, "proximal" refers to a portion of the system or device that is closer to a reverse osmosis filter, and "distal" refers to a portion of the system or device that is farther from the reverse osmosis filter. For example, the systems and methods herein may have an intake on a distal end and an exit on a proximal end, with the proximal end in fluid communication with a reverse osmosis filter.

Figure 1:
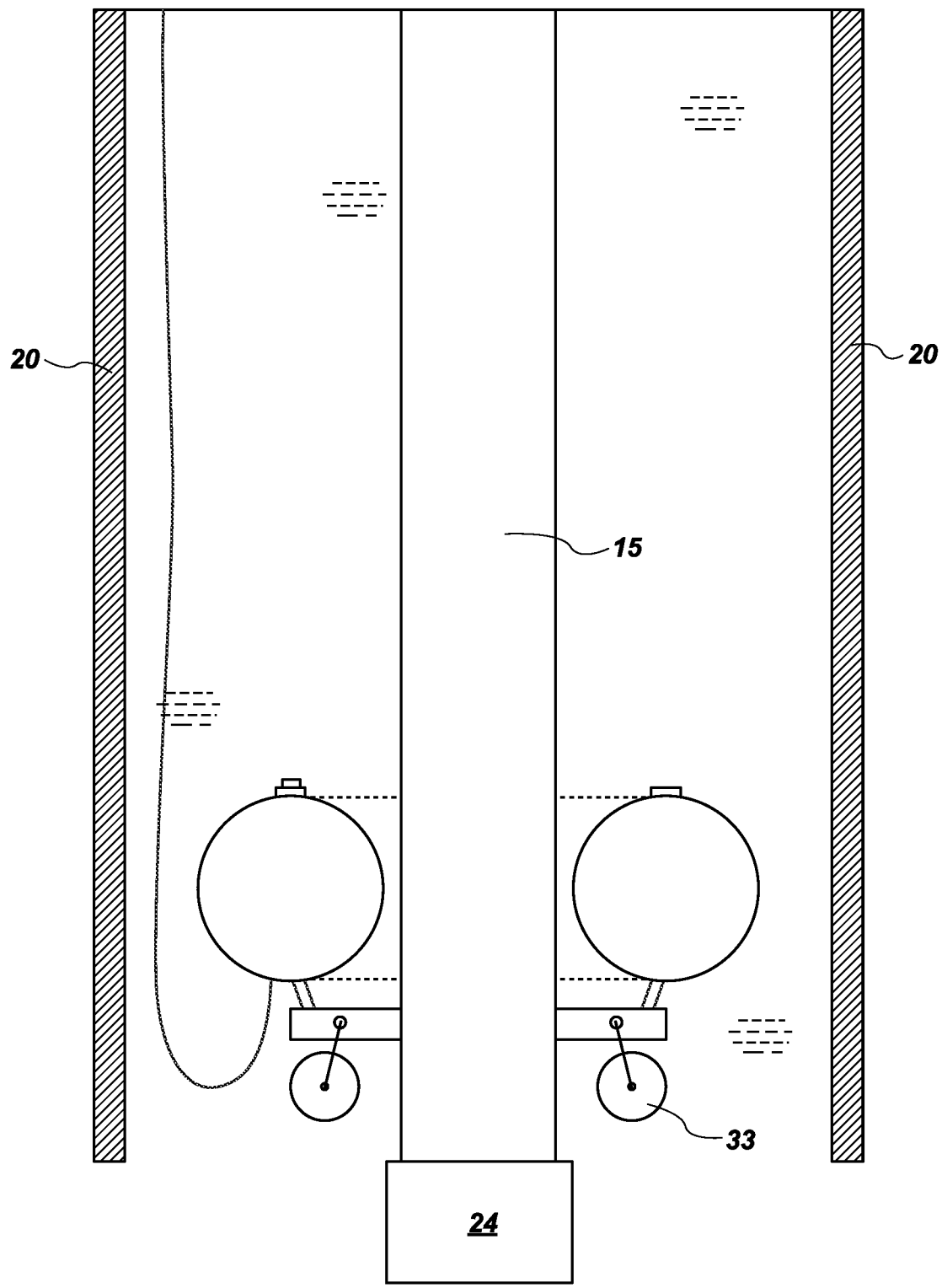
FIG. 1 is side, partially cut-away view of an exemplary water pumping system.
Figure 2:
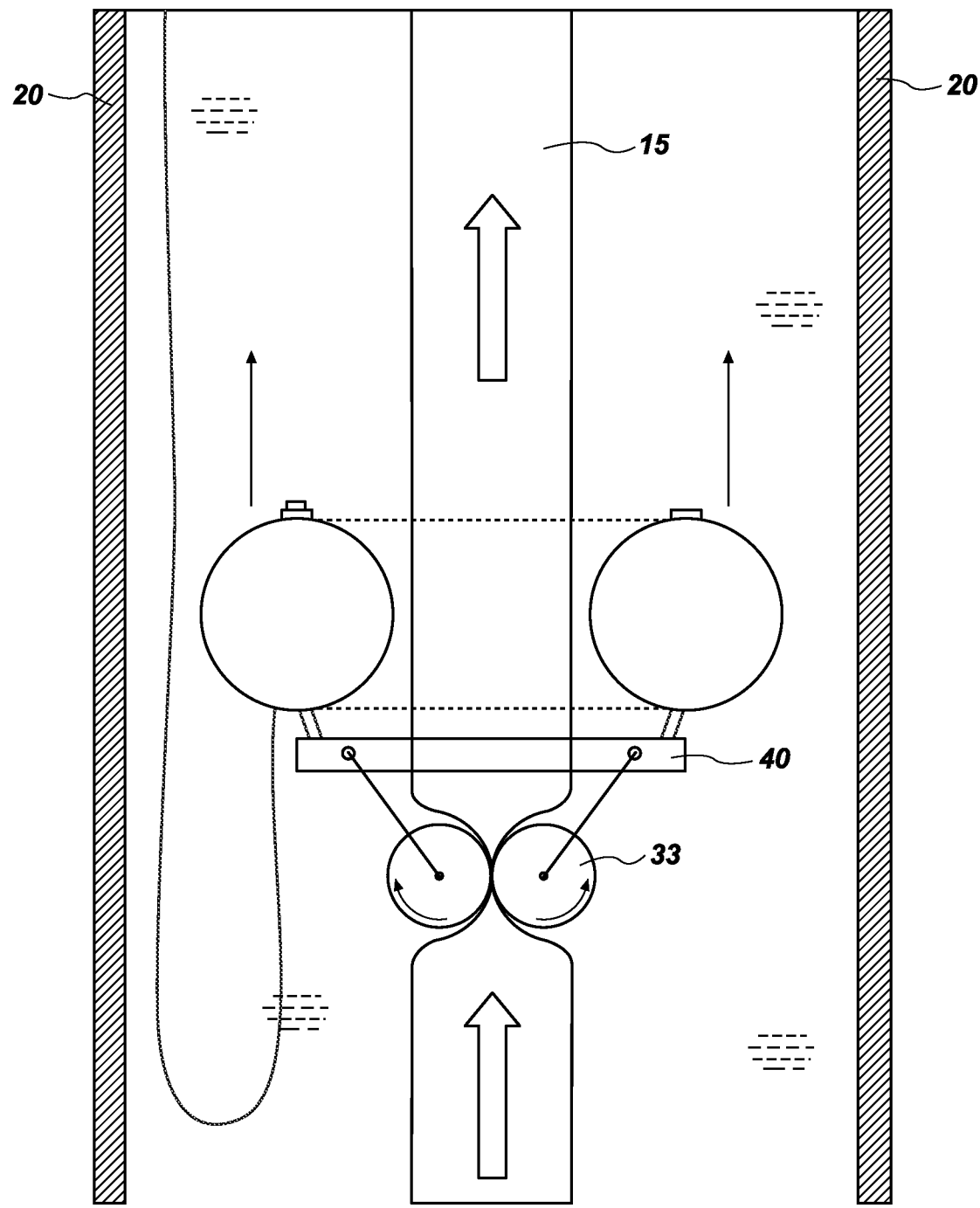
FIG. 2 is a side, partially cut-away view of the exemplary water pumping system of FIG. 1, with the clamps closed and the buoyancy support raising.
Figure 3:
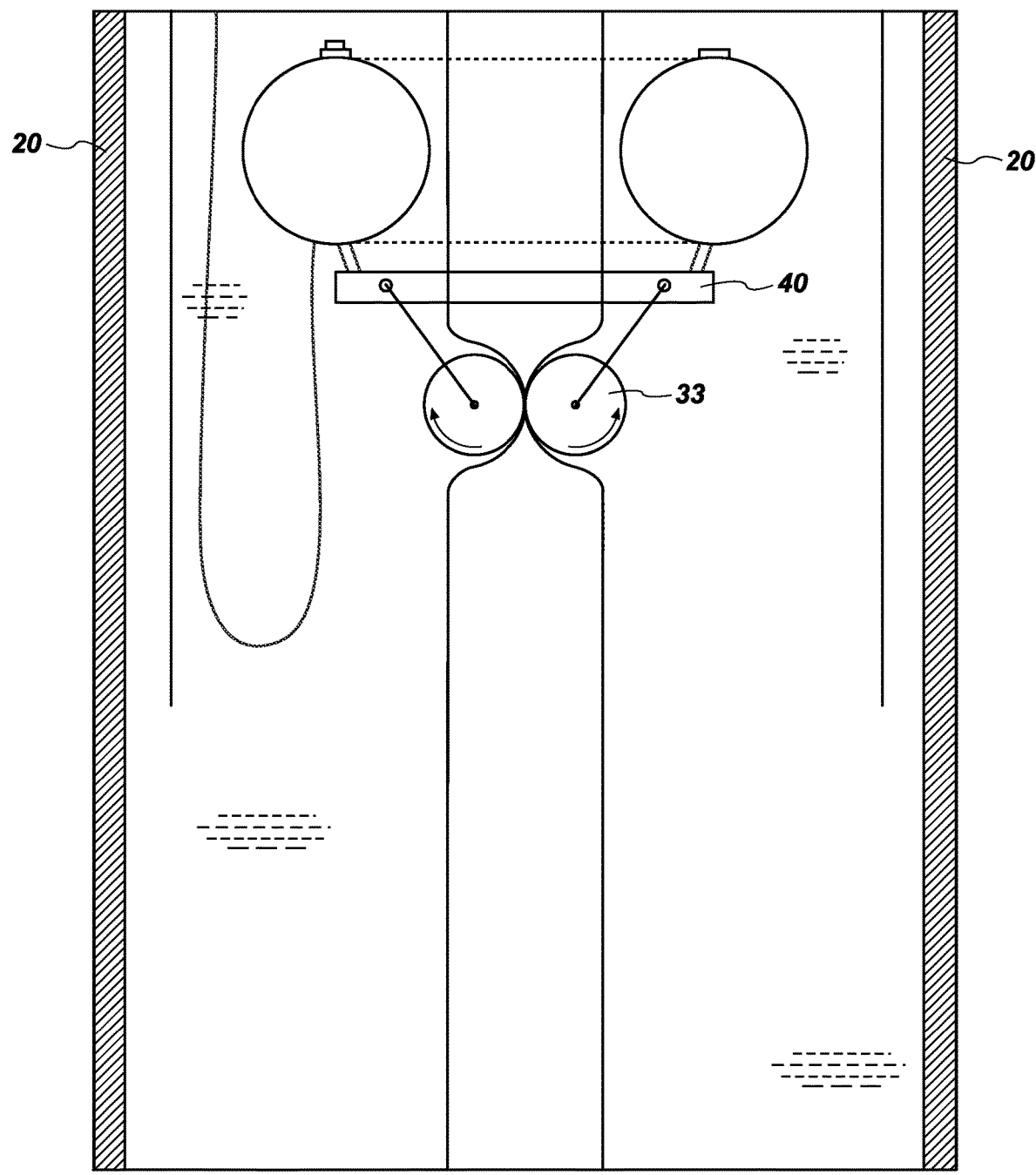
FIG. 3 is a side, partially cut-away view of the exemplary water pumping system of FIG. 1 with the clamps closed and the buoyancy support in a raised position.

Referring to FIGS. 1-3, an exemplary system and method of moving water up a vertical column comprises a system 10 with an inner, deformable hose 15 suspended within an outer, rigid water column 20. The hose 15 is deformable (i.e., compressible or contractible), and can alternate between a first configuration that is rigid or expanded and a second configuration that is flaccid or contracted. In general, the hose 15 may be expanded to a first, rigid configuration to allow salt water to enter into the hose 15 and fill the hose 15. Water is moved up the column to utilize the high pressure found at the bottom of the water column to reduce or eliminate the energy necessary to pressurize salt water to be driven across a reverse osmosis membrane.

A one-way valve 24 at the base or distal end 28 of the hose is used in some examples to ensure that water enters at the base or distal end 28 of the hose 15 but does not exit through the distal end 28. After the hose 15 is filled with salt water (either entirely or partially), one or more clamps 33 are clamped to the base or distal end 28 of the hose 15. In FIG. 1, clamps 33 are in an opened position, that is, not clamped onto hose 15.

Figure 4:
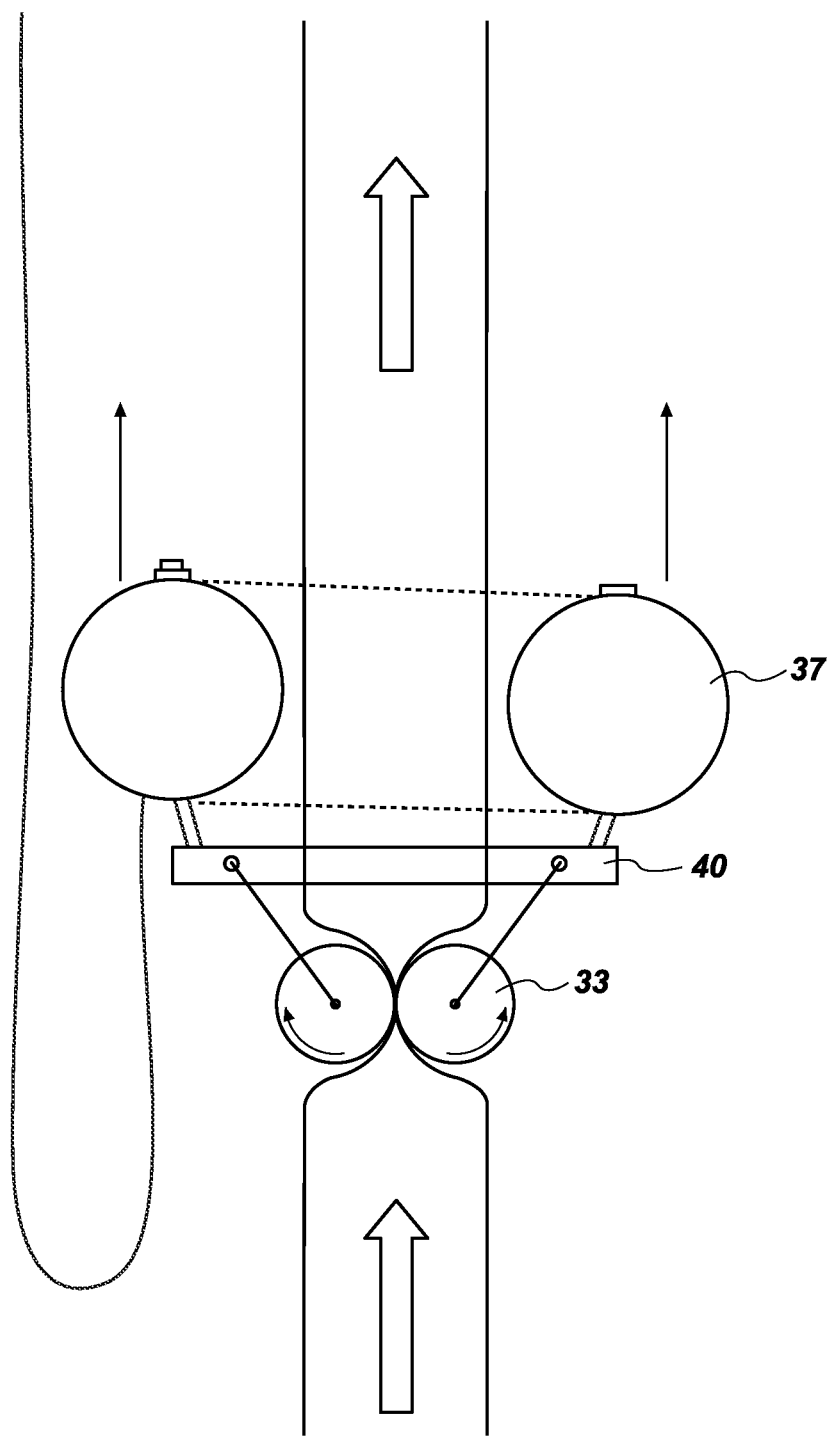
FIG. 4 is a side view of the inner water pumping system of FIG. 1.

Clamp(s) 33 are attached to a buoyancy support 37 that can selectively rise up or proximally within the rigid column 20. In other configurations, the buoyancy support 37 is not located within the column 20. After clamps 33 are secured in a closed position around the inner hose 15 (FIG. 2), buoyancy support 37 can begin to inflate and rise in the outer, rigid column 20. As clamp(s) 33 rises (FIG. 3), it compresses the deformable hose 15 and pushes up the salt water located within the hose 15 above the clamp(s) within the hose 15. The buoyancy support 37 with its attached clamp(s) 33 continues to rise, raising the salt water within the hose 15 proximally, until the salt water within the hose 15 reaches a predetermined vertical height. FIG. 3 shows clamps 33 rising along an inner hose 15 within an outer water column 20. For clarity, FIG. 4 shows clamps 33 rising along an inner hose 15 without an outer water column 20.

Figure 5:
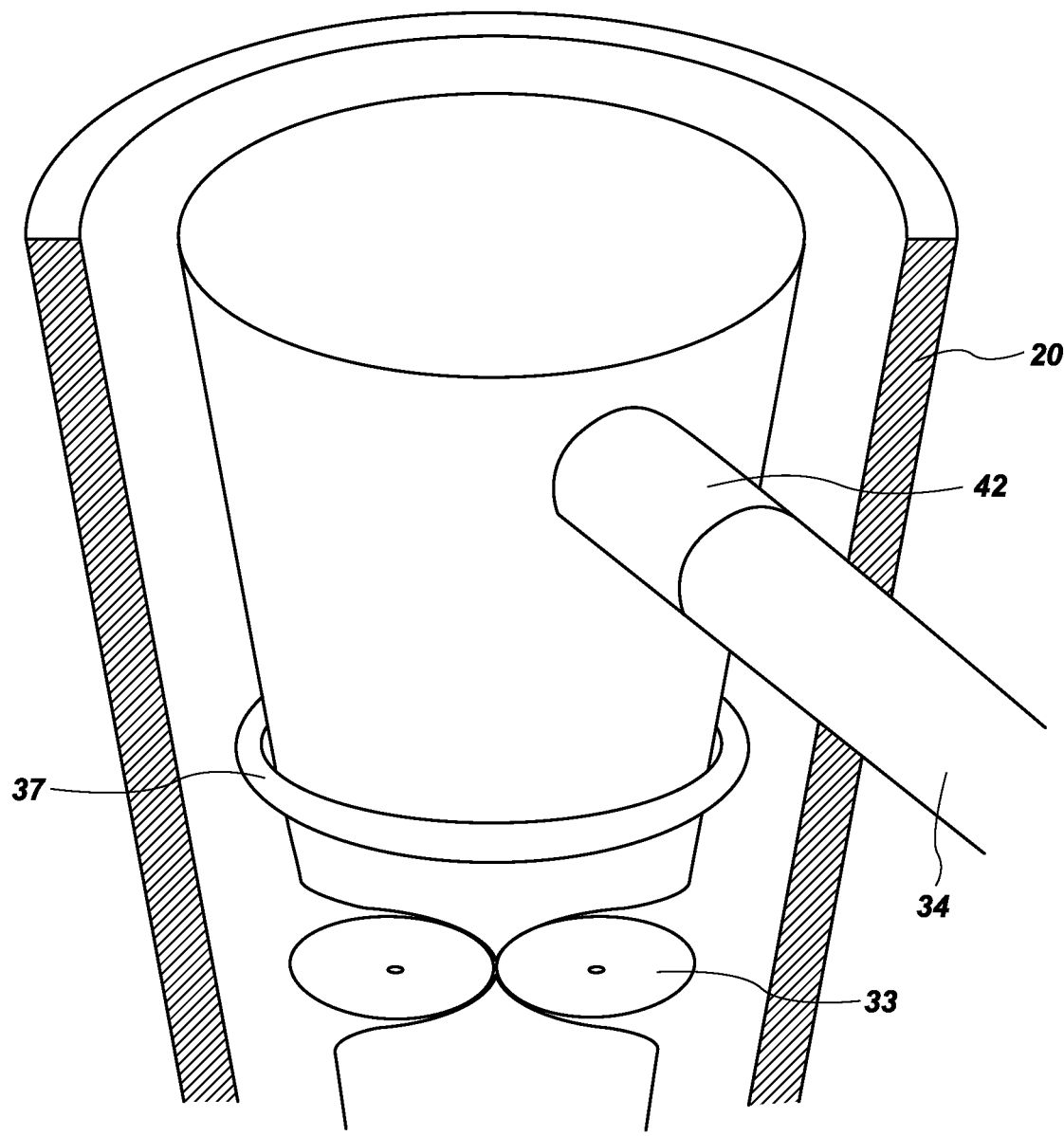
FIG. 5 is a perspective, partially cut-away view of another exemplary water pumping system.

At a predetermined vertical height, the hose 15 has a proximal end with an outlet 42. The salt water within hose 15 exits the hose at the predetermined height through the outlet at the predetermined vertical height. The outlet could be at the proximal end of the hose 15 such that water spills into the outer column 20, or the outlet could be an effluent pipe 34, see FIG. 5. In some examples, when the salt water within the hose reaches the predetermined vertical height, the water has pressure to pass through a reverse osmosis filter. In other examples, the predetermined vertical height can be calculated based on other factors or desires.

After all water within the hose 15 is lifted to the predetermined height and exits the hose, the buoyancy support system 37 is deflated, and the roller(s) 33 is/are unclamped from the hose 15. The roller(s) 33 fall to the bottom of the water column 20. The compressible hose 15 is expanded, and water is again allowed to enter the hose. Once the hose is full of salt water, the roller clamp(s) 33 are clamped to the base of the hose and the process is repeated of lifting salt water to the predetermined vertical height with a sufficiently high pressure to overcome a reverse osmosis filter.

Figure 6:
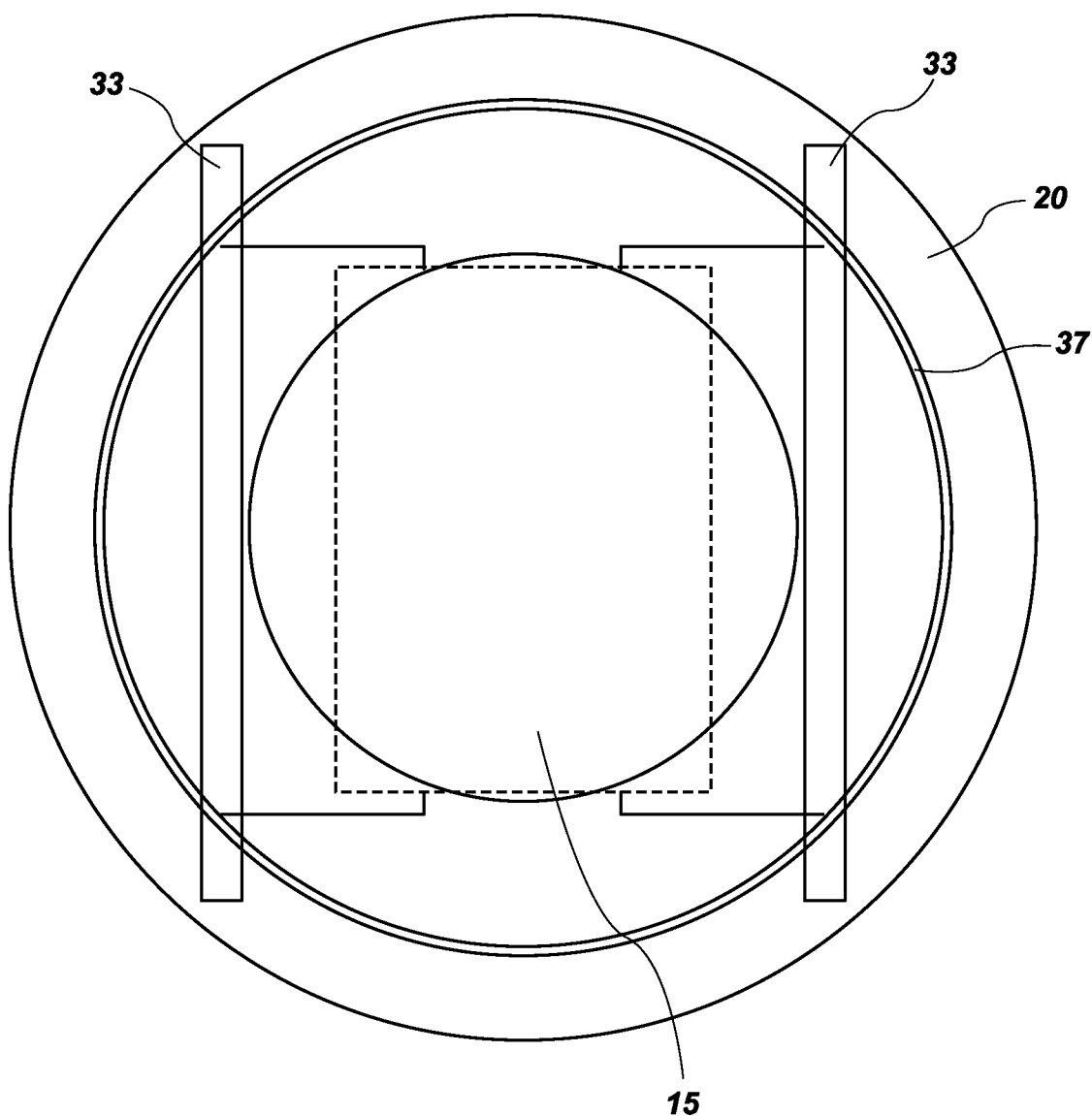
FIG. 6 is a top view of an exemplary water pumping system with two clamps to clamp an inner hose, the clamps in an open position and the buoyancy support deflated.
Figure 7:
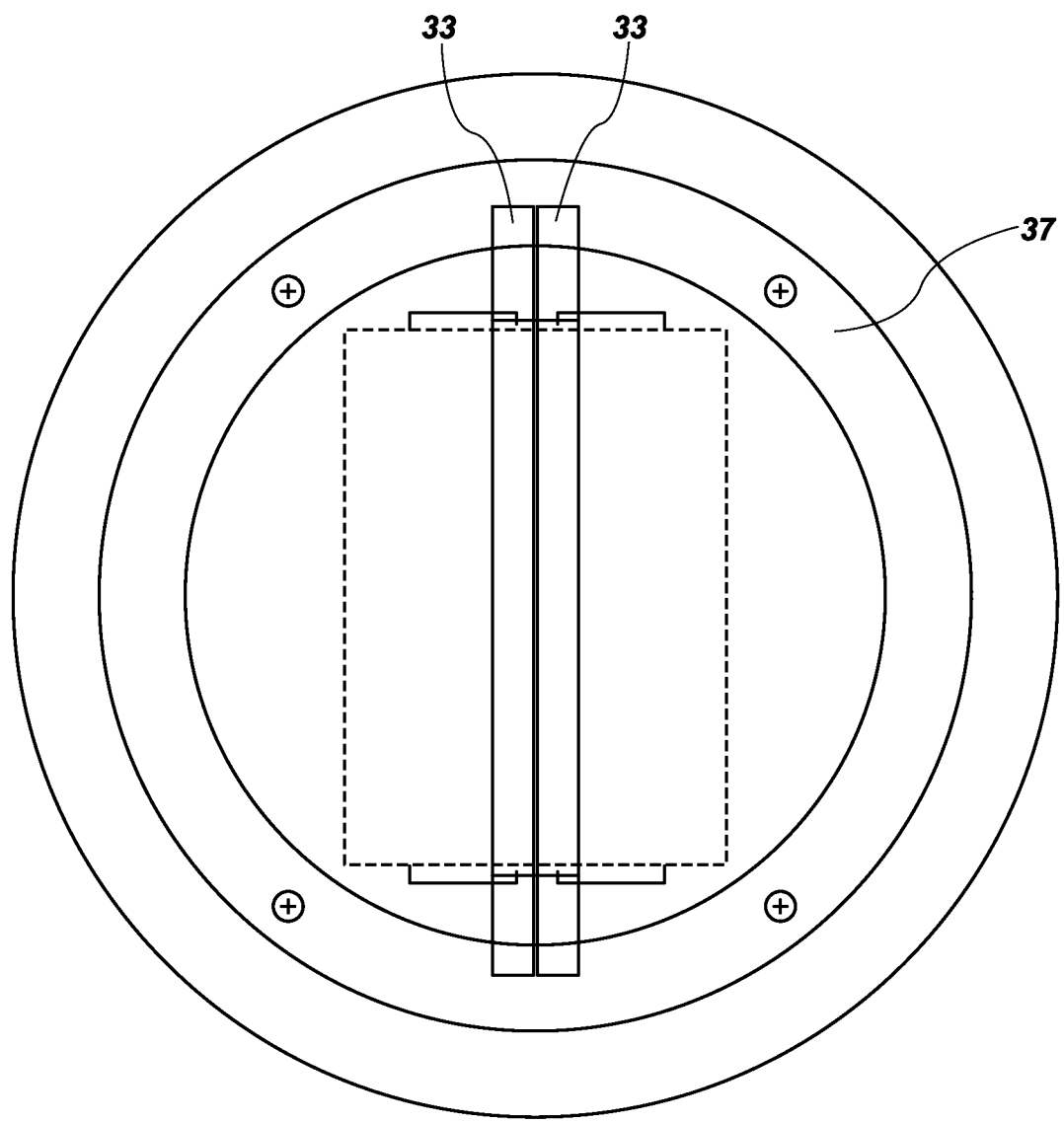
FIG. 7 is a top view of the exemplary system of FIG. 6, with the two clamps in a closed position and the buoyancy support inflated.

FIGS. 6-7 show top views of an open clamp configuration and closed clamp configuration, respectively. In this exemplary configuration, two clamps 33 are connected to the buoyancy support system 37 via a platform 40. The exemplary ballast of the buoyancy support 37 is a torus-shaped and raises the platform 40, and the clamps 33 are connected to the platform and therefore raise with the platform and buoyancy support system 37. Swinging or rotatable arms 39 connect the clamps 33 to the platform 40. Arms 39 can rotate to move the clamps 33 from the open configuration (FIG. 6) with hose 15 in its rigid configuration, to the closed configuration (FIG. 7) with hose 15 in its deformable configuration. Because hose is deformable, clamps 33 can fully close the hose 15. As clamps 33 rise with the platform 40 and connected buoyancy support 37, water within the hose 15 similarly rises.

Clamps can also be any other suitable type of compression device capable of closing the hose 15. As used herein, "clamp" means any type of compression device. This may be a roller or another type of compression device. Any device capable of compressing or otherwise selectively closing the hose 15 is considered a "clamp" for purposes of this disclosure. In some examples, a clamp is not used.

For example, the hose 15 may be selectively inflated and deflated along sections of the hose to drive water within the hose 15 upward vertically or generally vertically within the hose. In this example a roller clamp is not needed as the hose itself also acts as the compression device. Another exemplary configuration used to drive water upwardly includes a one-way valve to let water enter hose 15 at the base or distal end 28, and a one-way valve to allow water to exit the hose 15 at the proximal end. The hose 15 can first be made rigid and allowed to fill with water, and then be made flaccid. The water pressure exerted on the hose 15 from the water within the outer column 20 will compress hose 15 and will force water upward through the one-way exit valve at the proximal end. This example also does not require a clamp or compression device, as the water in the outer column 20 provides the pressure on hose 15 to drive water upwardly.

Rigid column 20 can be any suitable rigid pipe. In some examples, rigid column 20 is formed by drilling a hole into a mountain peak or hillside with a suitable elevation and the column 20 is located within the formed hole. In other configurations, a structure may be built to support the rigid column. Or rigid column 20 could be located within the ocean or another body of water. In applications where the pumping system is used within the ocean, a rigid outer pipe is not necessary.

Column 20 can have any suitable height. In some configurations, the column 20 has the height needed for water at the bottom of the column to have sufficient pressure to overcome a reverse osmosis filter. Or column can have a height that is needed for water at the bottom of an effluent pipe coming off the column to have sufficient pressure to overcome a reverse osmosis filter. The height can also be more or less depending on the desired application.

For example, for every 33 feet of depth, pressure increases by 1 atmosphere or 14.7 psi. The formula for pressure at depth is P=density of fluid gravity depth. Because the density of water and gravity are both constant it is a linear relationship between the pressure of water and depth (or in our case height) of water. In one exemplary configuration, the column 20 can be located in a mountain with a height of about 3,000 feet above sea level. If 1,200 feet above sea level is the minimum depth of the column, the column has around 1,800 feet of water. The pressure at the bottom of the column, then, is about 800 psi. If 750 feet above sea level is the maximum depth, the column has around 2,250 feet of water and the pressure at the bottom of the column is then around 1,000 psi. Depending on the pressure needs, the column height/depth can be adjusted.

With reference to FIGS. 8-11, there are several variations for inner, deformable hose 15. Inner hose 15 includes a distal end 28 for receiving water (i.e., an intake) and a proximal end 26 to allow water to exit (i.e., an outlet 42). At the distal end 28, a one-way valve 24 (shown in FIG. 1) can be provided to ensure water only enters the hose 15. A one-way valve can also be provided at the proximal end 26 to ensure water only exits the proximal end 26. In other configurations, one-way valves are not used.

Deformable hose 15 can have a first, rigid, or filled position, and a second, flaccid, compressible, or unfilled position. These two positions can allow water to enter the distal end 28 of the hose 15 when the hose 15 becomes rigid in the first position, and once the hose 15 is flaccid again the hose 15 can be compressed with one or more clamps attached to buoyancy supports to raise the water in the inner hose 15.

Hose 15 can alternate between the first, rigid position and the second, flaccid position in several ways. In one example, the hose 15 includes a series of air channels 54 that can be selectively filled to inflate the hose into the first, rigid position. Air channels can be filled with air, gas, water, or any other suitable liquid or gas to inflate the hose 15. Air channels 54 can be selectively filled with air to inflate the hose 15 into the first, rigid position. In other examples water channels 54 can be used and selectively filled with water to inflate the hose 15 into the first, rigid position. Other configurations for water and/or air channels are possible. In one example, the air and/or water channels extend vertically in straight columns around the entire circumference of the hose 15, or in another configuration the air and/or water channels extend vertically in straight columns around part of the circumference of the hose. Or, the hose 15 can be formed of rigid and semi-rigid materials to alternate between the first, rigid position and the second, flaccid position.

Figure 10:
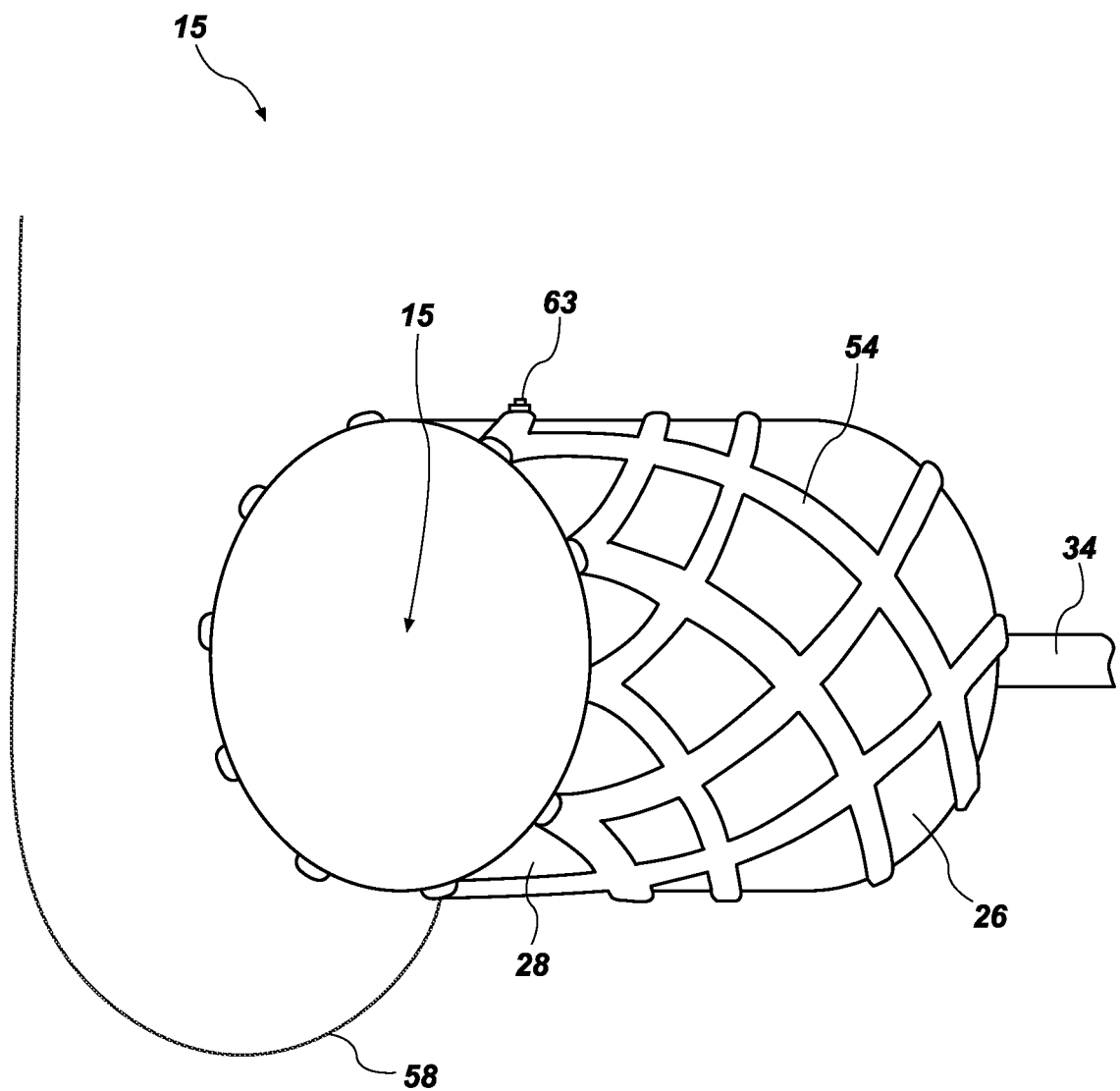
FIG. 10 is a perspective view of another exemplary inner hose that can be used with the water pumping system.
Figure 11:
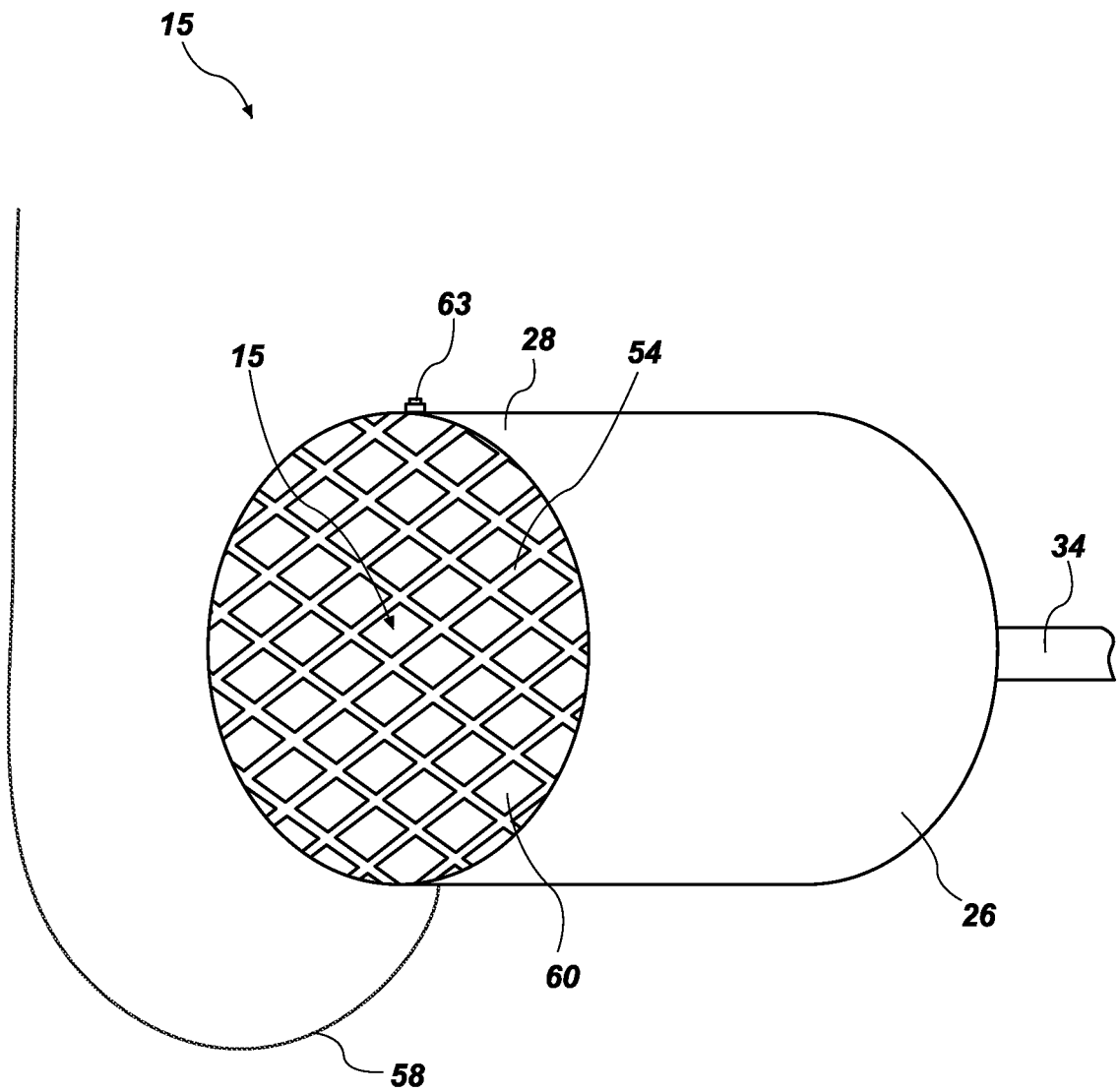
FIG. 11 is a perspective view of another exemplary inner hose that can be used with the water pumping system.

In some configurations, air channels 54 form a lattice. FIG. 8 shows a cross-sectional view of a hose 15 in the first, rigid position, with the air channels 54 filled. FIG. 9A shows a perspective view of a hose 15 with an air channel 54 that has a helical shape extending around an exterior surface 56 of the hose 15. FIG. 9B shows a perspective view of a hose 15 with an air channel 54 formed of vertically joined "X" shapes extending around an exterior surface 58 of the hose 15. FIG. 10 shows another configuration of the air channel 54 forming a lattice around the exterior surface of the hose 15. FIG. 11 shows a similar configuration, with the lattice air channel 54 facing an interior lumen 60 of the hose 15. Many other configurations can be used for the air channels 54 including rings, bars, connecting rings at an angle, two layers of hose quilted together, etc. Air channels 54 can be provided on hose 15 in any suitable configuration.

Air channels 54 can be in fluid communication with an air supply hose 58 for selectively inflating air channels 54. An air release valve 63 can allow air to be removed from air channels 54 as needed and desired. FIGS. 10-11 show a configuration of hose 15 with an effluent pipe 34 for outlet on proximal end 26. Effluent pipe 34 can be rigid, or deformable, or it can be formed in a similar manner to the hose 15 and have the ability to alternate between a first, rigid position and a second, deformable or flaccid position. Effluent pipe 34 can be oriented vertically, horizontally, or any other direction as desired. FIGS. 10-11 also illustrate that the inner hose 15 can be oriented horizontally, vertically, or any other direction as desired and depending on the particular application.

In use, the air channels 54 can be inflated by providing air through the air supply hose 58. As the air channels 54 are inflated, the inner lumen the hose 15 can fill with salt water. Once the hose 15 has filled with the desired amount of salt water, the air channels 54 can be deflated through one or more air release valve(s) 63. This would allow clamp(s) 33 to push the flaccid hose 15 inwardly and rise water within the flaccid hose 15. Clamp(s) 33 can also roll or slide upwardly. In some examples, the air channels fill below the clamps or other compression means, and as the air channels fill from below, it also urges the clamps upwardly (and allows water to fill the hose below the clamps).

Water can enter the distal end 47 of the hose 15 several different ways. For example, a vacuum process can be used to fill the hose, or a density difference, or filling the hose with air. Negative pressure from a rising roller clamp assembly or a pump could be used to fill the first end or distal end 47 of the hose, as described in more detail below. If the hose 15 is in fluid communication with the saline water source (such as the ocean), the pressure from the source should raise the level of water within the hose 15 to the level of the source. If the hose 15 is in fluid communication with the ocean, the pressure from the ocean raises the level of water within the hose to sea level.

As the inner lumen 60 of the hose 15 takes on a negative pressure, it can draw water into the lumen 60. When the inner lumen 60 is filled to the desired amount, air release valves 63 can be opened to move the hose 15 from the first, rigid position to the second, deformable position. As the hose 15 is collapsed, water can exit the proximal end (either spilling over the proximal end 26, or through an effluent pipe 34 or other outlet on proximal end 26).

Depending on the length of any individual segment of the hose 15, the hose 15 can be used as a negative pressure chamber to aid in drawing water through a filter, or drawing water for transport. The length of the hose 15 can be adjusted depending on the particular needs for the application. For example, longer segments could be used for water transport over a longer distance or elevation/height.

Figure 12:
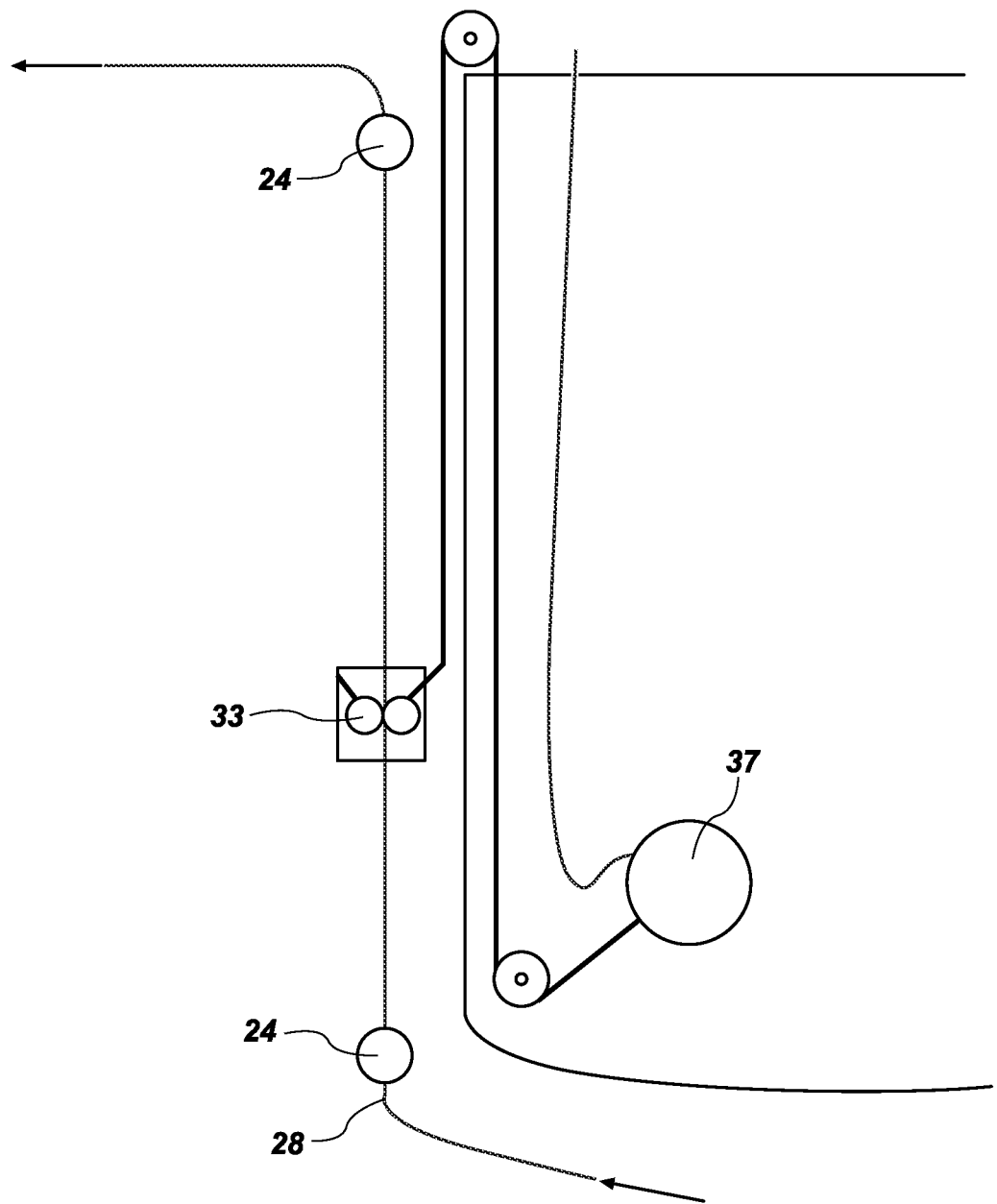
FIG. 12 is a side view of an exemplary water pumping system, with the buoyancy support connected to the clamps via a pulley system.

FIG. 12 illustrates an exemplary vertical hose 15 used to transport water vertically up the hose 15. A one-way valve 24 is provided on the distal end to allow water to enter the hose 15. A one-way valve 24 is also provided on the proximal end to ensure water can only exit the hose 15 and not enter. Buoyancy support 37, rather than being located in the same water column as hose 15, is instead in connection with the clamps 33 through a pulley system 65.

FIGS. 13 through 20 illustrate various exemplary methods of filling the hose 15. In these examples, the hose 15 is in fluid communication with the ocean, and sea level is indicated by the horizontal dashed line 70. While these methods are described as discrete solutions for clarity, a combination of the methods can be used to effectively draw water into the hose 15, and other methods can also be used.

Figure 13:
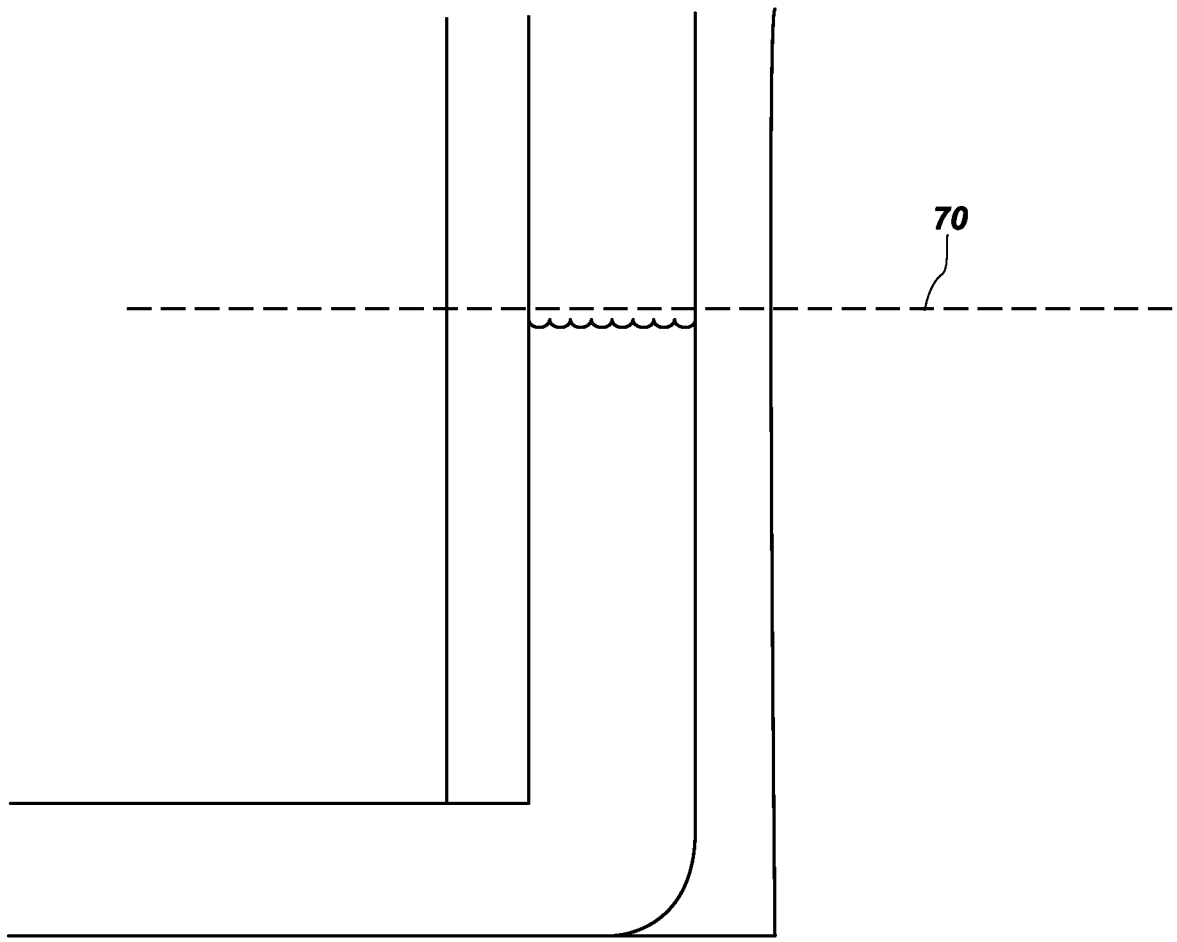
FIG. 13 is a cross-sectional view of water within an inner hose of an exemplary system, the water rising to a height within the hose at the height of sea level.
Figure 14:
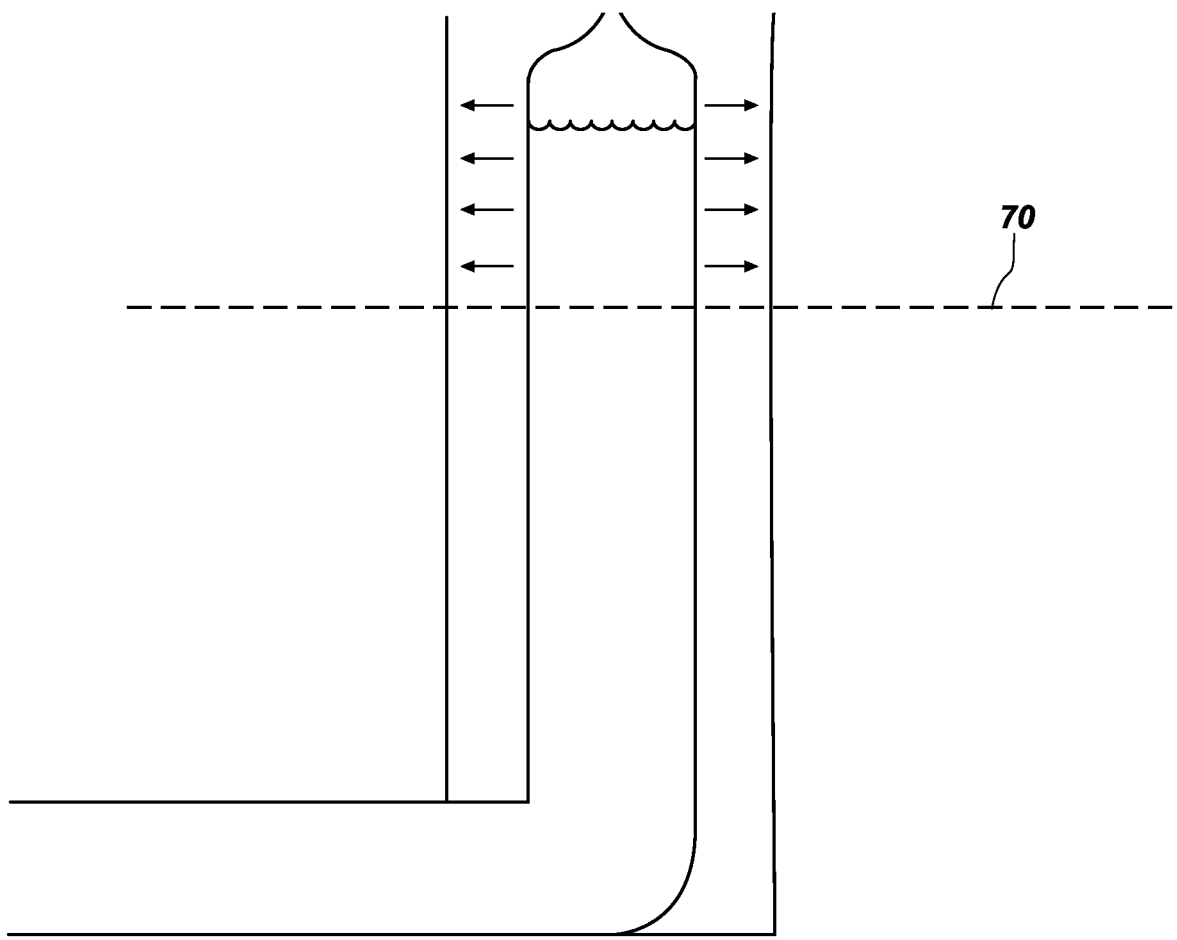
FIG. 14 is a cross-sectional view of water within a hose of an exemplary system, the water rising above the height of sea level due to negative pressure caused by expansion of the inner hose.
Figure 15:
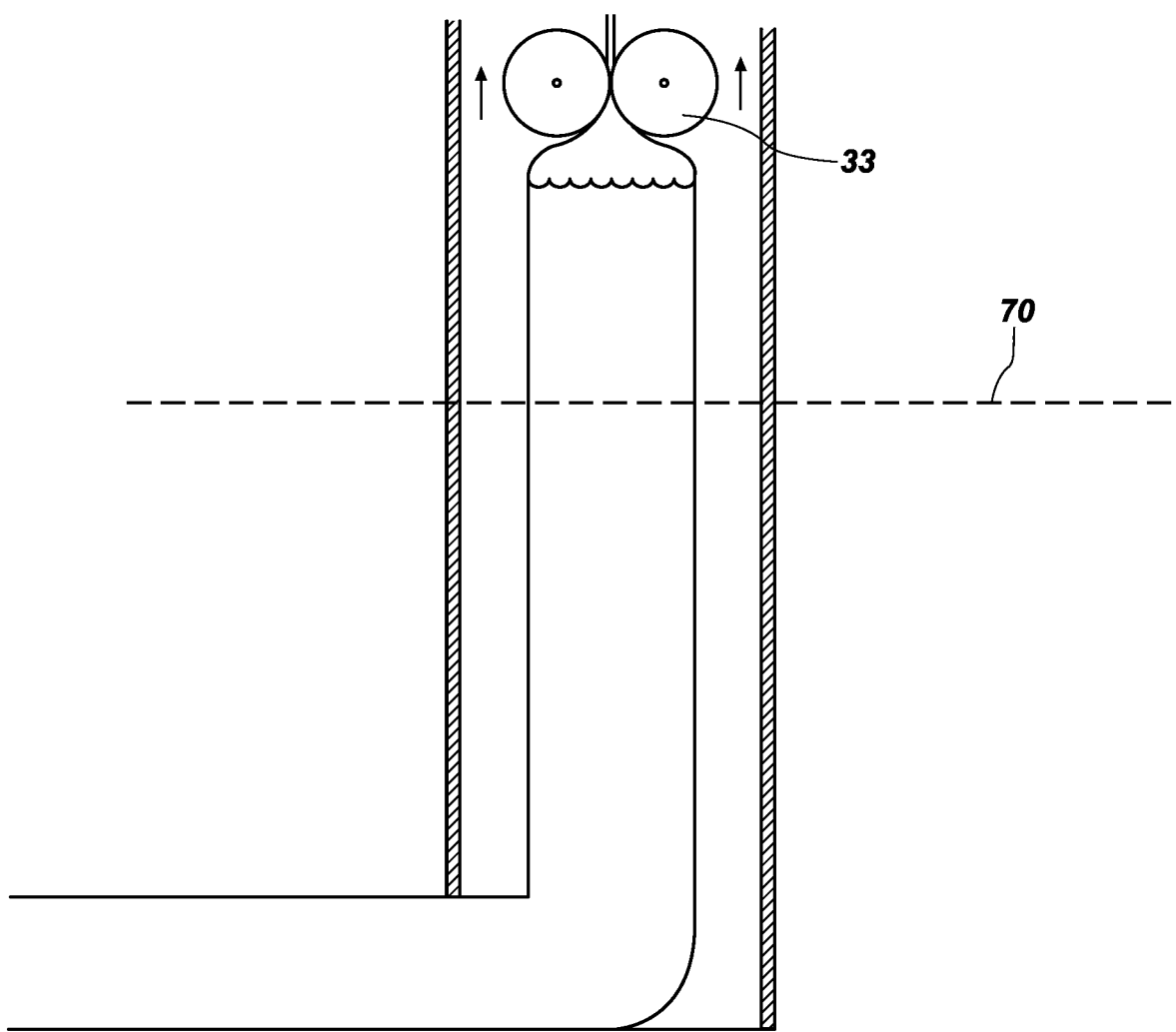
FIG. 15 is a cross-sectional view of water within a hose of an exemplary system, the water rising above the height of sea level due to negative pressure caused by rising clamp(s).

FIG. 13 illustrates that the incoming water will rise within the hose 15 to the sea level 70. FIG. 14 illustrates an expansion of the inner lumen of the hose 15. This expansion creates a negative pressure within the hose 15 and draws water upwardly within hose 15. FIG. 15 shows clamps 33 clamping hose 15 and rising, creating a negative pressure to draw water upwardly within hose 15.

Figure 16:
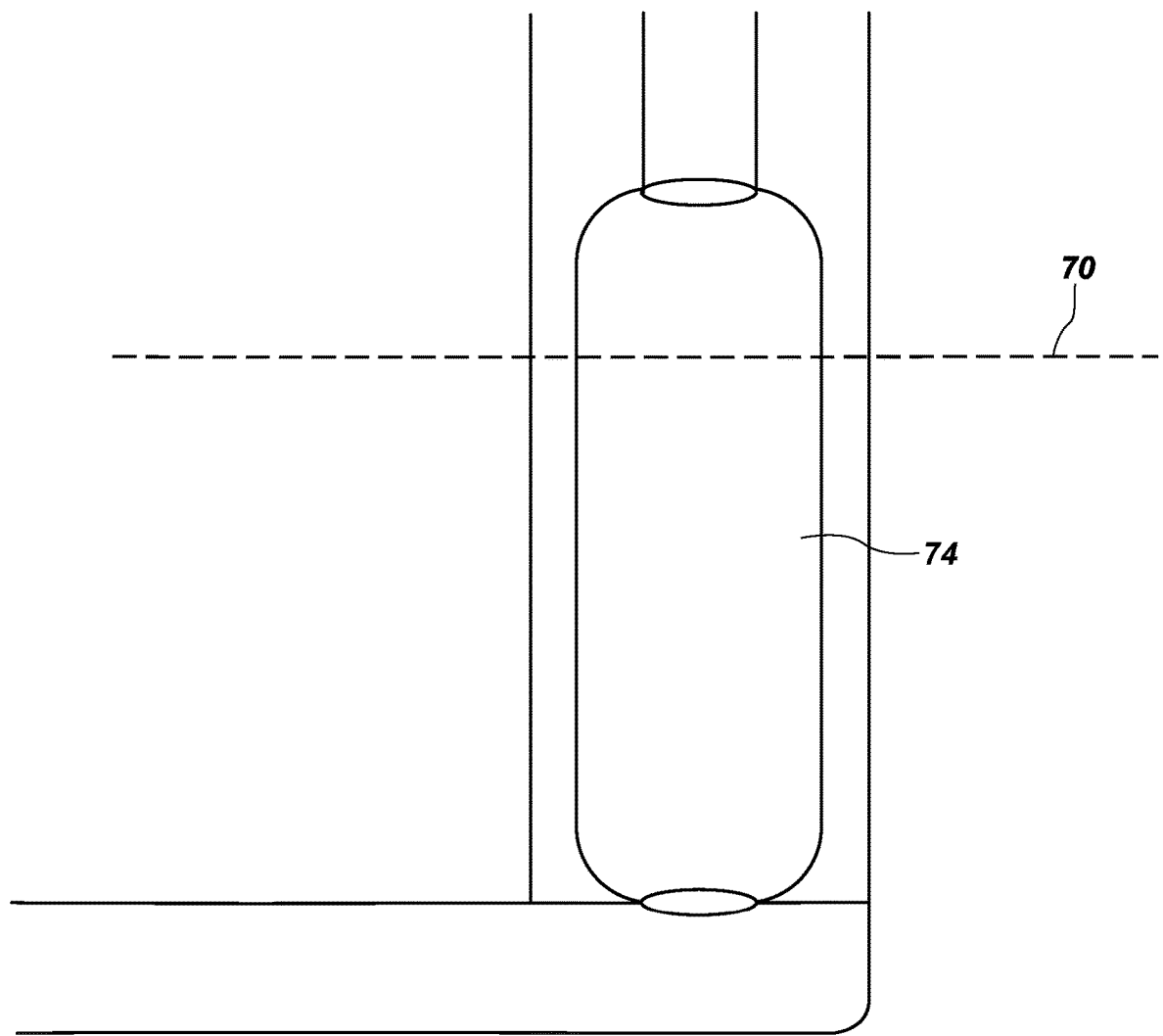
FIG. 16 is a partial cut-away view of water within an exemplary pump system, the water rising above the height of sea level due to a pump being expanded.
Figure 17:
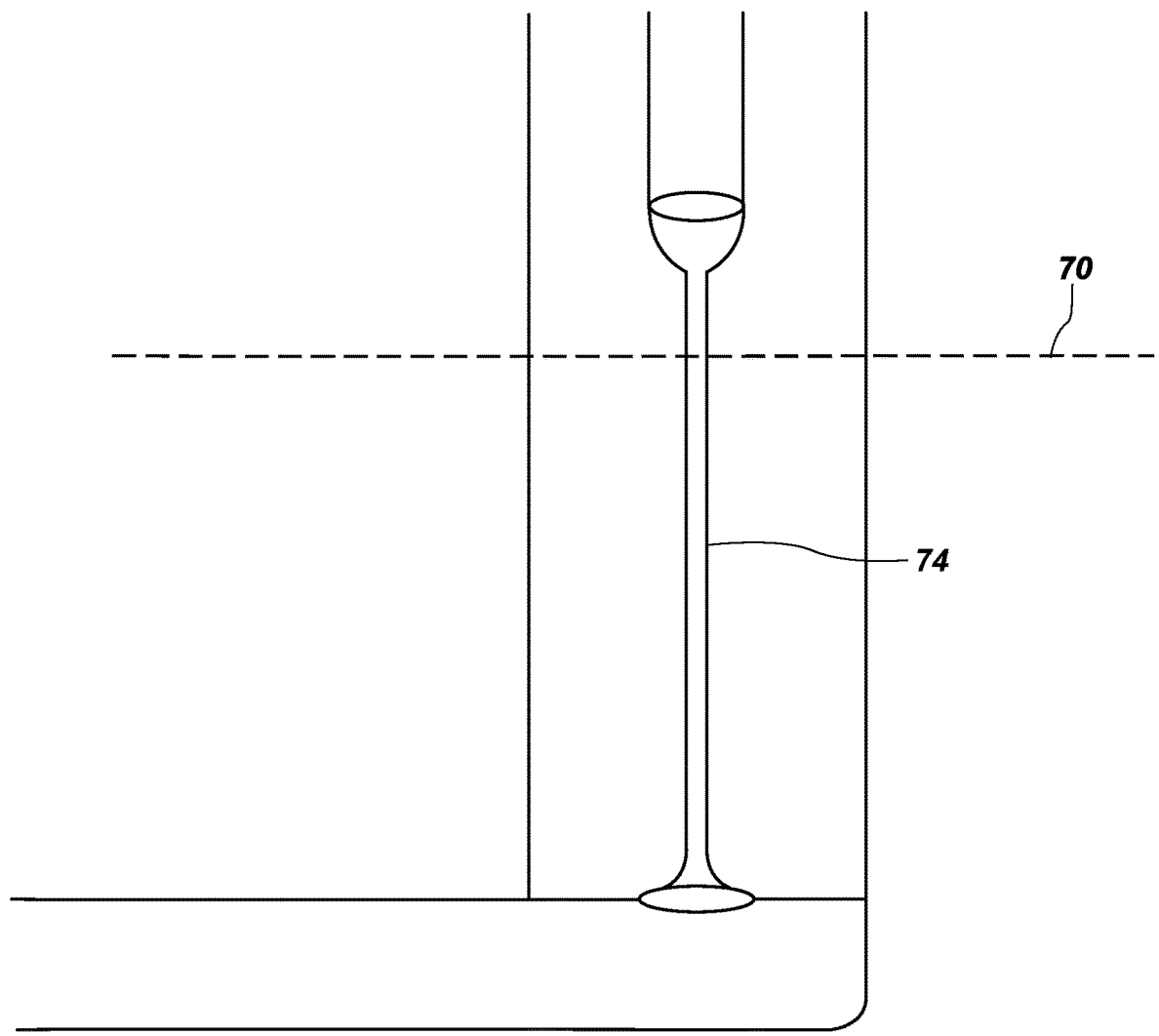
FIG. 17 is a partial cut-away view of water within the exemplary pump system of FIG. 16, with the pump being compressed.

FIGS. 16-17 show another exemplary configuration with a pump 74 formed of a portion of tubing or bag that has an expanded (FIG. 16) and a contracted (FIG. 17) position. One-way valves can be provided before and after pump 74 such that water can only enter the pump 74 on the distal end and only exit on the proximal end. The pump can achieve the expanded and contracted positions by various methods, such as inflating, or expansion through the use of specialized materials.

Figure 18:
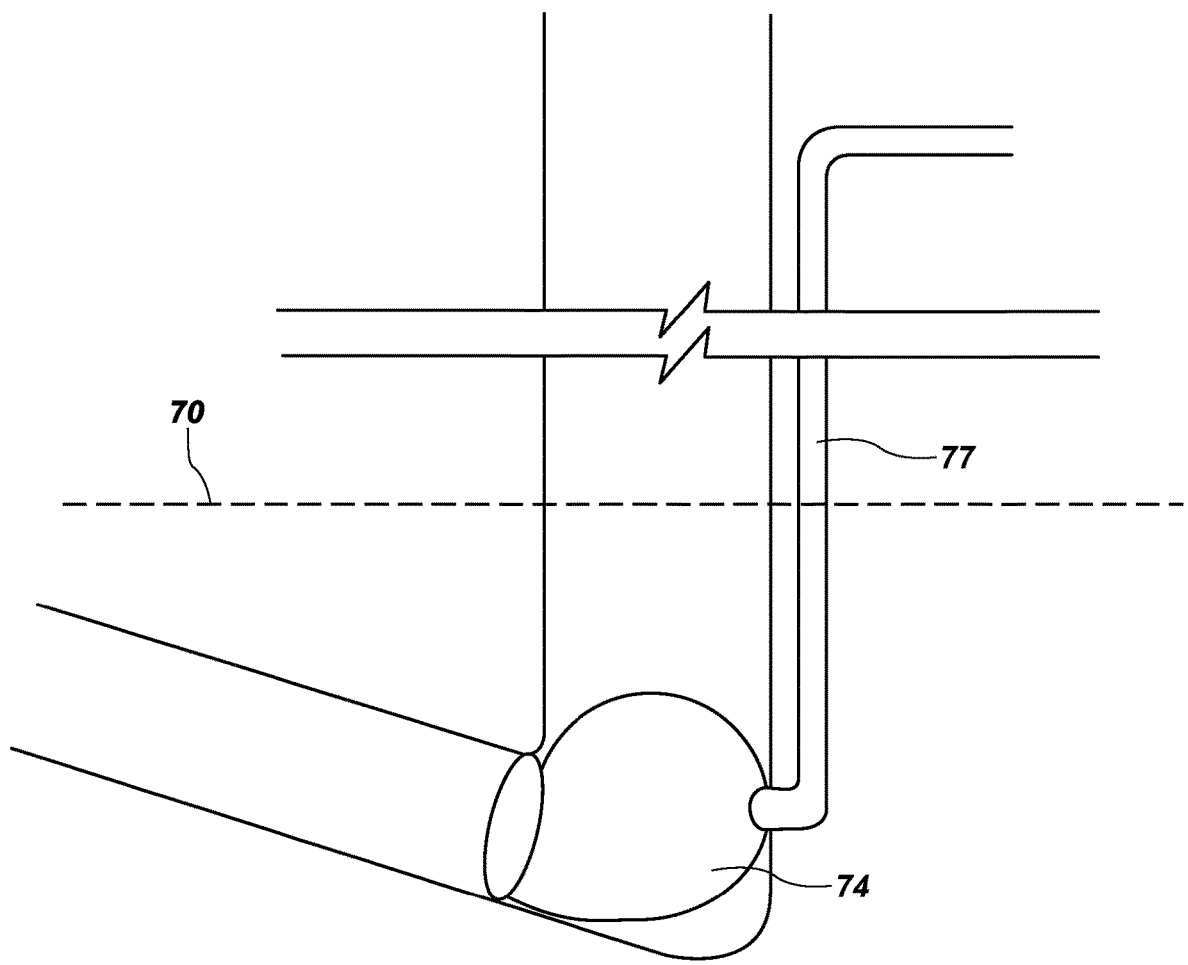
FIG. 18 is a side view of another exemplary water pumping system with a pump bag.
Figure 19:
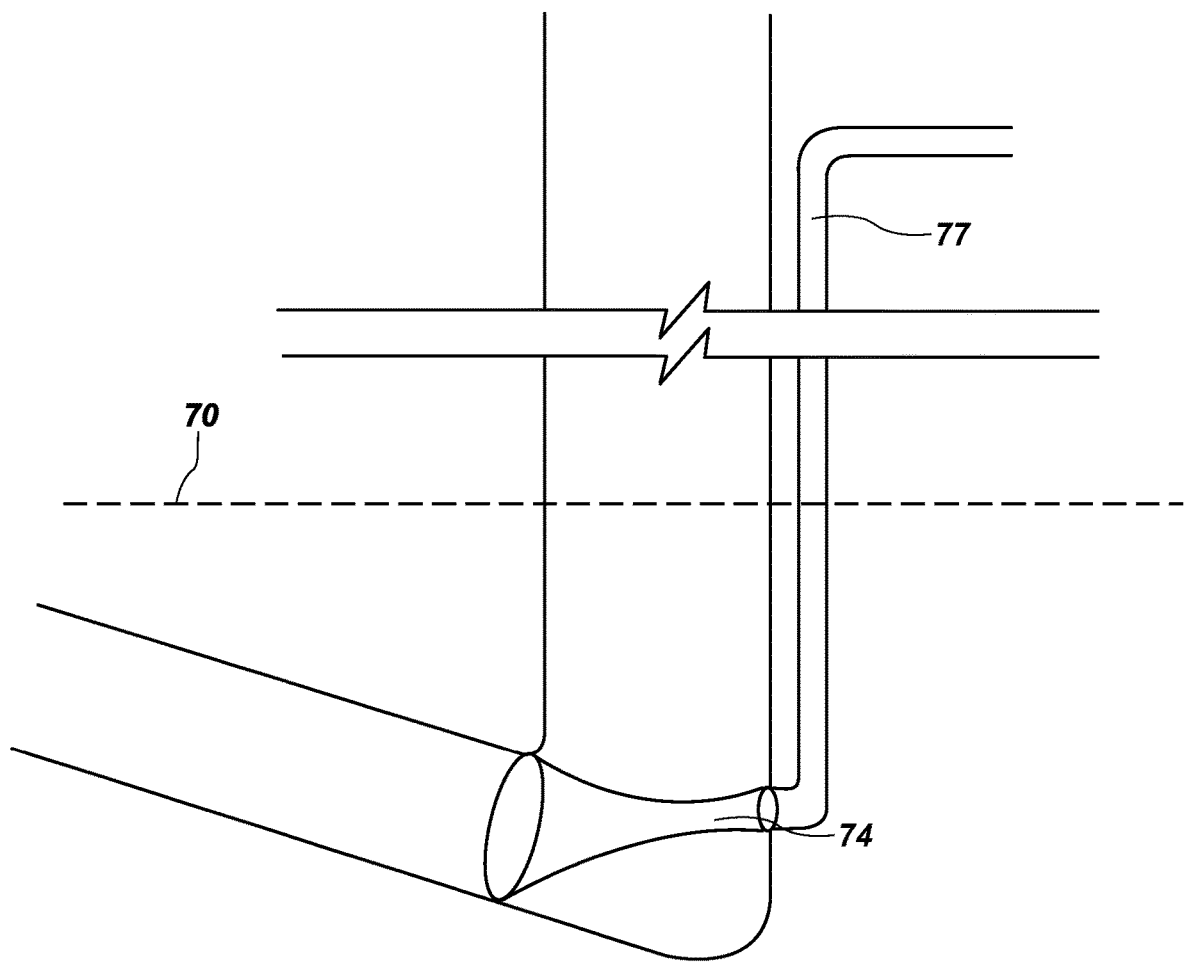
FIG. 19 is a side view of the exemplary water pumping system of FIG. 18, with the pump bag compressed.

In some configurations, only a pump 74 can be used, and an expandable hose with a buoyancy support may not be needed. For example, pump 74 could be used in circumstances where the water column is higher than the discharge level. With reference to FIGS. 18-19, a configuration with only a pump 74 is used. The pump is expanded to fill with water (FIG. 18), and then contracts (FIG. 19) to pump water from distal end of the pump to proximal end of the pump. The outlet which water is being pumped into comprises a hose or pipe 77 that is external from water column 20 in these configurations.

Figure 20:
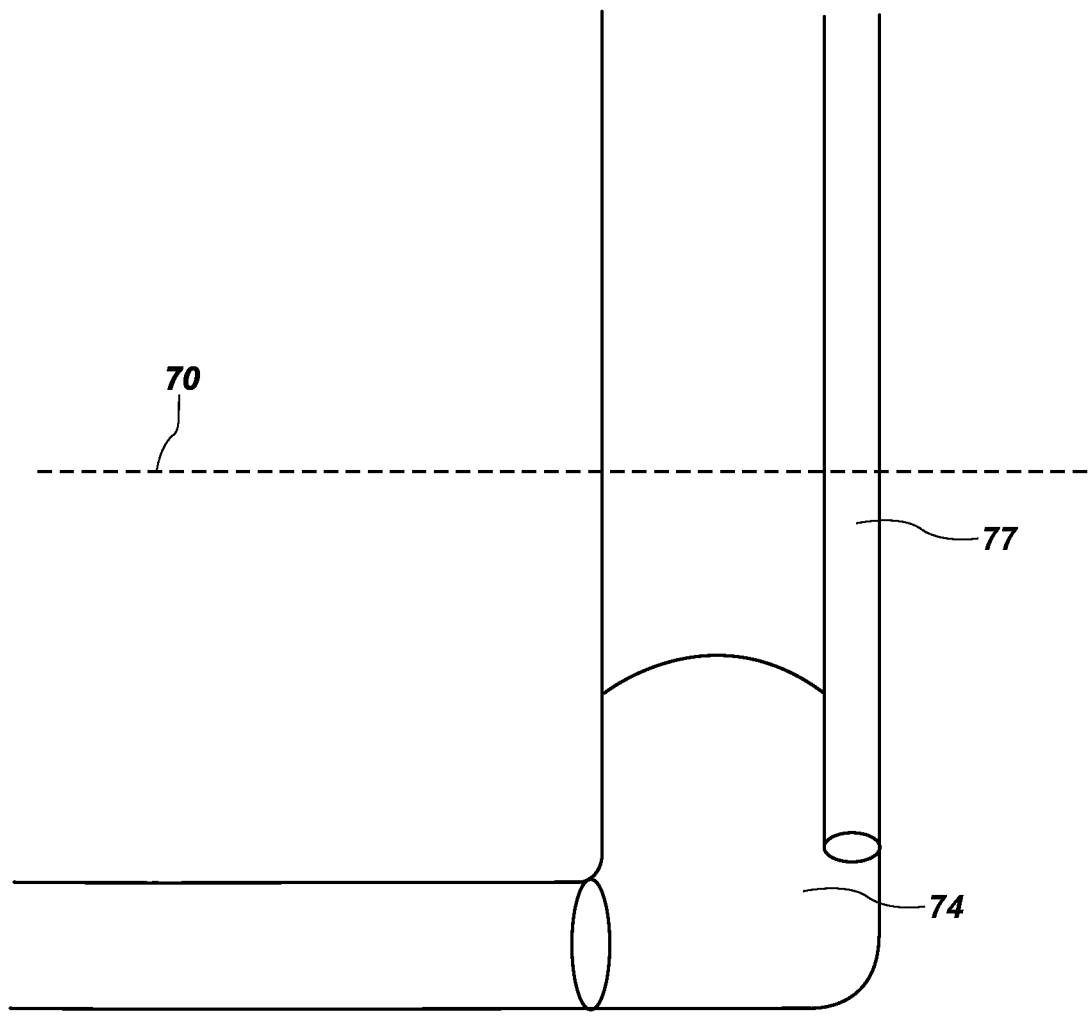
FIG. 20 is a side view of another exemplary water pumping system with the water rising within a pipe or hose that is internal to the water column.

FIG. 20 shows a configuration with the hose and/or pipe 77 where water is rising can be internal to the water column 20. For example, pipe 77 can be located on a side of the water column 20 as shown in FIG. 20, or pipe 77 can be located in the center or any other positioned as desired for the particular configuration.

Figure 21:
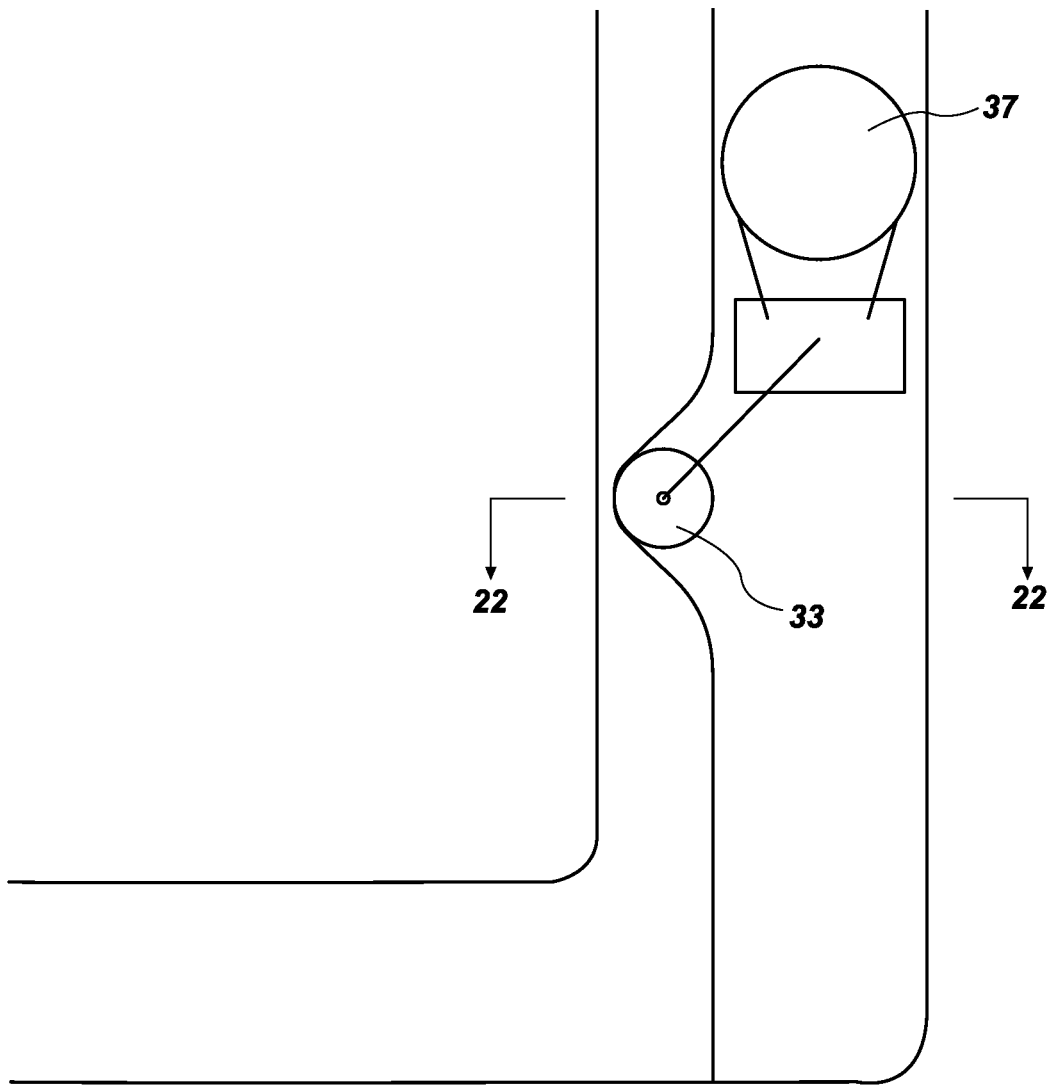
FIG. 21 is a side view of another exemplary water pumping system with the water being raised within a hose positioned towards one side of the water column.
Figure 22:
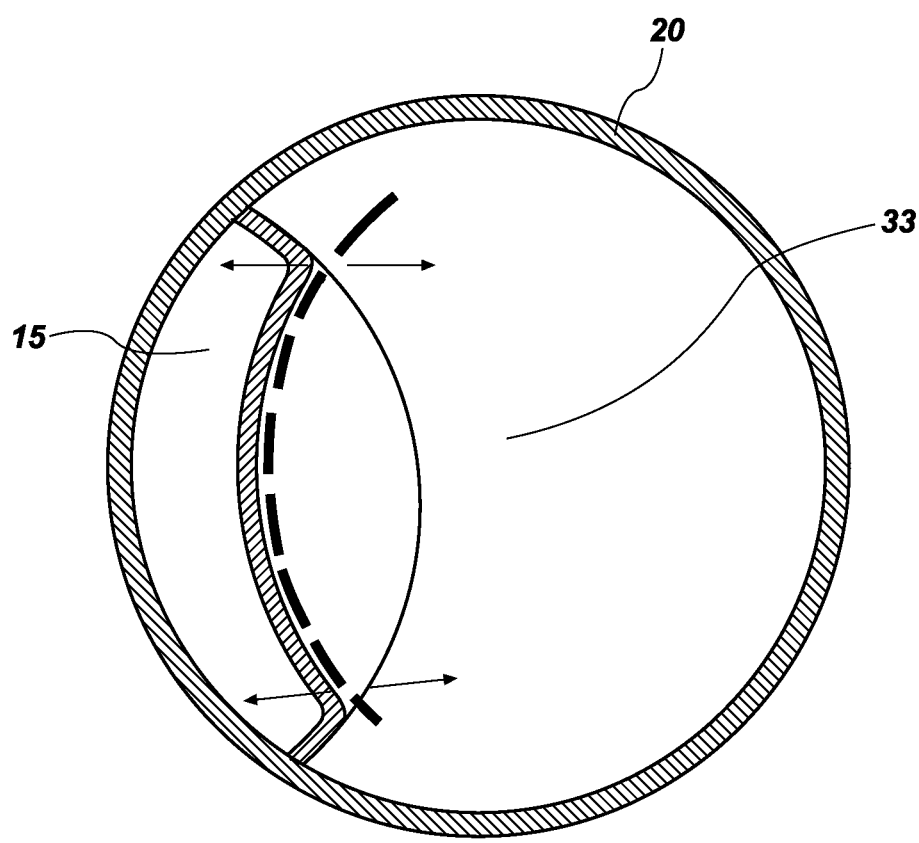
FIG. 22 is a cross sectional view of the exemplary water pumping system of FIG. 21, taken along line 22 in FIG. 21.

In configurations with rollers to move water up the hose 15, various configurations of rollers are possible. For example, one roller may be used, or two or more rollers clamped together can be used. FIGS. 21-22 illustrates a configuration with one roller used. Hose 15 is positioned towards one side of column 20, such that when roller 33 presses hose 15 when hose 15 is in the second, compressible configuration, the hose 15 collapses towards the side of the column 20. Clamp 33 is attached to the buoyancy support.

Figure 23:
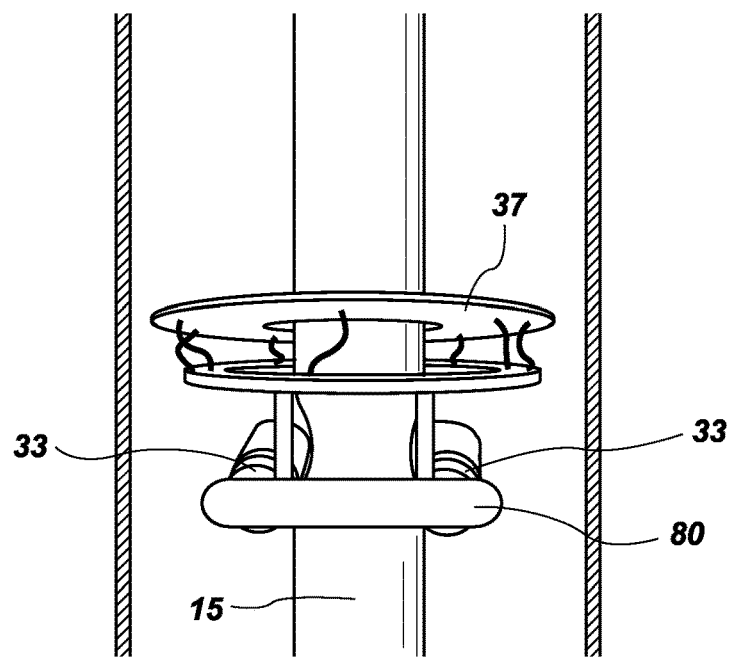
FIG. 23 is a side, perspective, partially cut-away view of another exemplary configuration of a water pumping system, with a water-raising device having a clamp in an open position and a buoyancy support in a deflated configuration.
Figure 24:
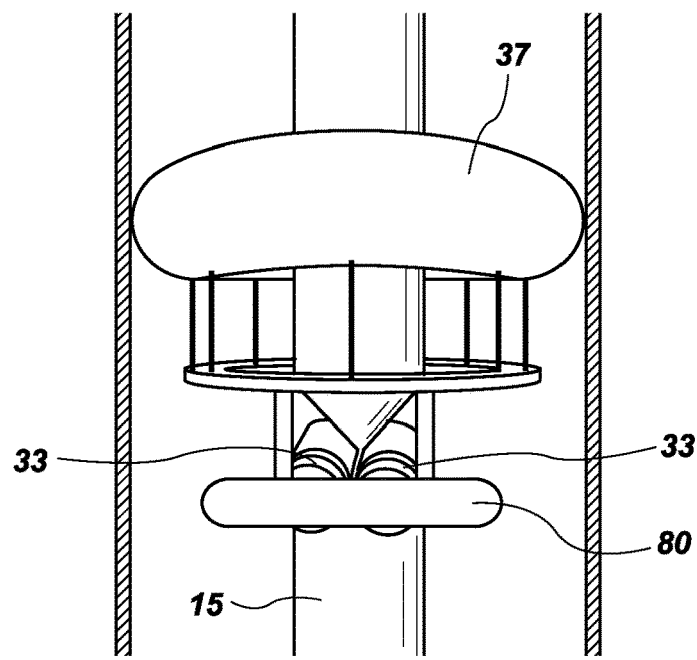
FIG. 24 is a side, perspective, partially cut-away view of the exemplary configuration seen in FIG. 23, with a water-raising device having a clamp in a closed position and a buoyancy support in an inflated configuration.

With reference to FIGS. 23-24, a configuration with two roller clamps 33 is shown. The roller clamps 33 are mounted on a frame 80. The buoyancy support 37 can also be mounted to the frame 80 or otherwise connected to the clamps 33. The roller clamps 33 are able to move laterally on frame 80. The roller clamps 33 have a first, unclamped position (FIG. 23) in which the hose 15 can be filled and the rollers are located towards the outer edge of the frame 80. After the hose 15 is filled, the roller clamps 33 move to the second, clamped position toward the middle of the frame 80 (FIG. 24).

Movement of the roller clamps from the first position towards the outer edge of the frame 80, to the second position towards the middle of the frame 80, can be achieved in multiple ways. For example, the roller clamps can be mechanically actuated with a motor, the rollers may be electromagnets which are attracted to each other and selectively activated, the rollers can be activated with an air driven piston, the rollers can be inflatable etc. In some embodiments the rollers are configured to move along a track. Or, the clamps 33 need not be rollers but can be mounted clamps 33 or other compression devices having other shapes and capable of closing and moving along the hose 15, or simply capable of opening and closing. A series of clamps positioned along the length of the hose could move water proximally within hose 15 by opening and closing in a particular order.

Buoyancy support 37 can be attached to the frame 80. One or more buoyancy supports can be used. FIGS. 23-24 show an exemplary buoyancy support that is torus-shaped. The buoyancy support can be selectively filled and has an unfilled configuration (FIG. 23) and a filled configuration (FIG. 24). In other configurations, the buoyancy support can have other shapes and sizes, and multiple buoyancy supports can be used as needed to provide the necessary lift to raise the water within hose 15. When the buoyancy support has raised the water to the desired predetermined height, the buoyancy support 37 can be deflated, to allow the frame 80 with clamps 33 to lower relative to the hose 15. Air release valves can be provided on the upper or top side of the buoyancy support. Air release valves can release air as needed to allow the buoyancy support 37 to deflated, and also release small amounts of air as the buoyancy support rises, because as the buoyancy support rises, the air within the buoyancy support expands.

Various configurations can be used to lift water up a hose 15 within a column 20. In some configurations, a single water-raising device 85 (consisting of clamp(s) 33 with a buoyancy support 37) can be used. In other configurations, sets of water-raising devices 85 can be used in conjunction to effectively move water up the hose 15 within column 20. With reference to FIGS. 25-29, an exemplary configuration of water being raised up a column is shown, with use of two water-rising devices. An upper water-raising device 85a and a lower water raising device 85b both work in conjunction along hose 15 within column 20. As explained in more detail below, the upper device 85a lowers as the lower device 85b raises, and the upper device 85a raises as the lower device 85b lowers.

Buoyancy supports 37 generally work as ballasts and are selectively inflated to increase the buoyancy of the clamps (and therefore raise water) or deflated to decrease the buoyancy of the clamps (and therefore drop the clamps). Other methods can also be used to raise water or other liquids within the system. Examples include Venturi tubs, varying sizes of alternating flaccid and rigid bags and hoses, etc., could be used. Or, in another example, the hose 15 itself can have sections that are alternately inflated and deflated to drive water upwardly within the hose 15. A separate clamp/compression device with a buoyance support is not required in this example.

Several devices can be used as a water-raising device and are contemplated. In configurations where a buoyancy support 37 is used to raise a clamp 33 or other compression device, rigid buoyancy devices can be used. Rigid buoyancy devices do not change shape as water enters them to make them sink, and air enters them to make them rise. For example, ABS plastic barrel or other rigid materials can be used to form a buoyancy support. Or the buoyancy support can be compressible and/or non-rigid. In one example, the buoyancy support can include a buoyant ball that, when inflated, compresses the inner hose. As the inflated buoyant ball rises, it pushes all of the water in the inner hose 15 upwardly until it reaches an effluent pipe at the top of the inner hose.

In systems which are positioned in the ocean or other large body of water, a pump can include a large inflated bag that is underwater. When valves are opened to release air from the large inflated bag, it pushes water into a pipe and pumps water upward. Systems in the ocean or other large bodies of water may not include the outer rigid pipe 20, because the ocean or large body of water provides the water to create necessary buoyancy.

Figure 25:
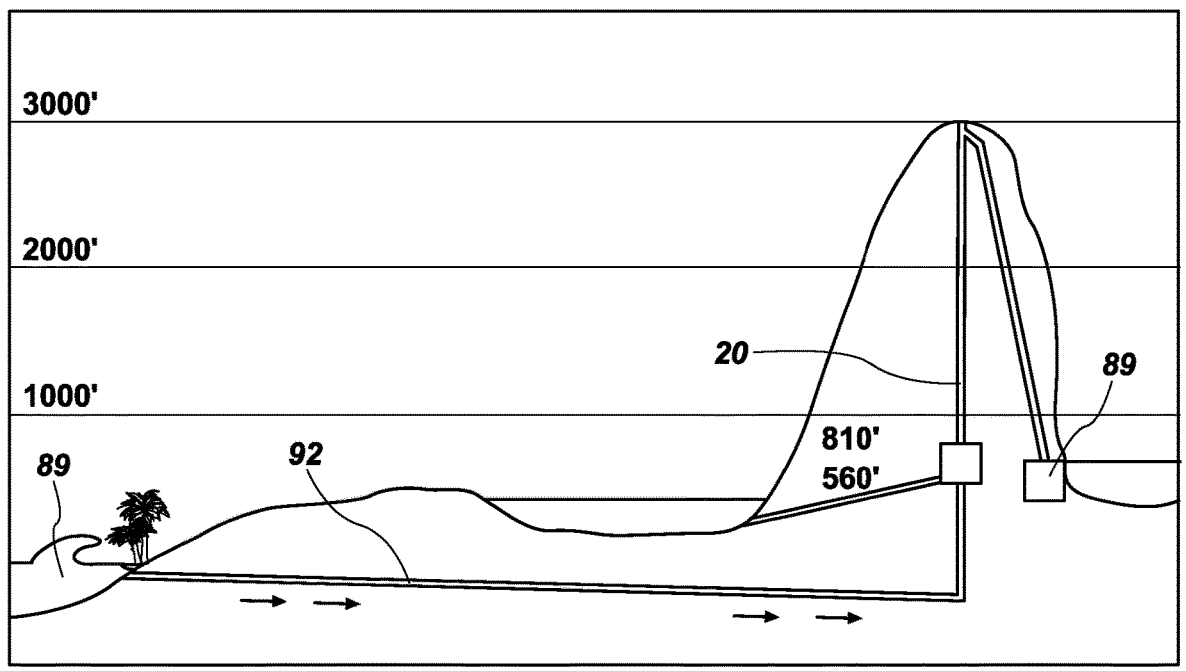
FIG. 25 is a side view of a schematic for an application of the water pumping system showing water entering from the ocean.
Figure 26:
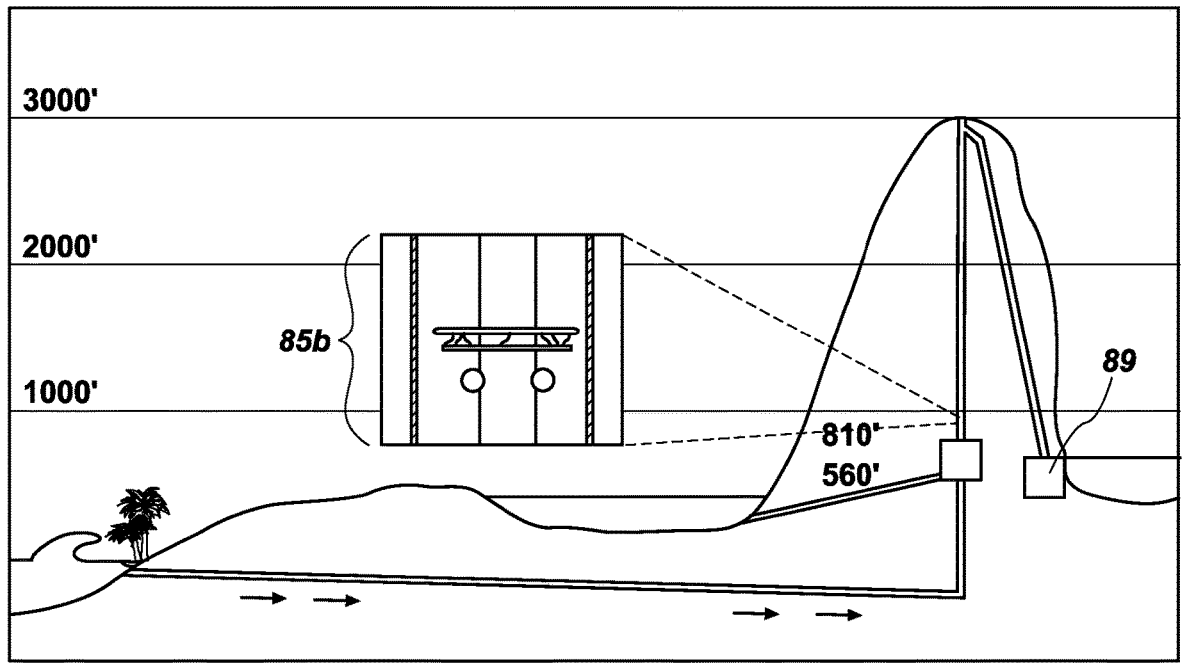
FIG. 26 is a side view of a schematic for an application of the water pumping system showing water that entered from the ocean preparing to be raised.

FIGS. 25-29 show a schematic of one exemplary application of a water pumping system. Water to be desalinated can begin, for example, in the ocean 87 (FIG. 25). Water can flow slightly downhill, as indicated by the arrows in FIG. 25, through a pipe 92, until it reaches the base of the water column 20. Water column 20 in this exemplary application is located within a mountain peak or hill. At the base of the water column 20, the water begins to rise and fill the hose 15 (such as by vacuum force, etc.) as shown in FIG. 26. A lower water-raising device 85b remains in the open configuration until the hose 15 is at the desired fullness.

Figure 27:
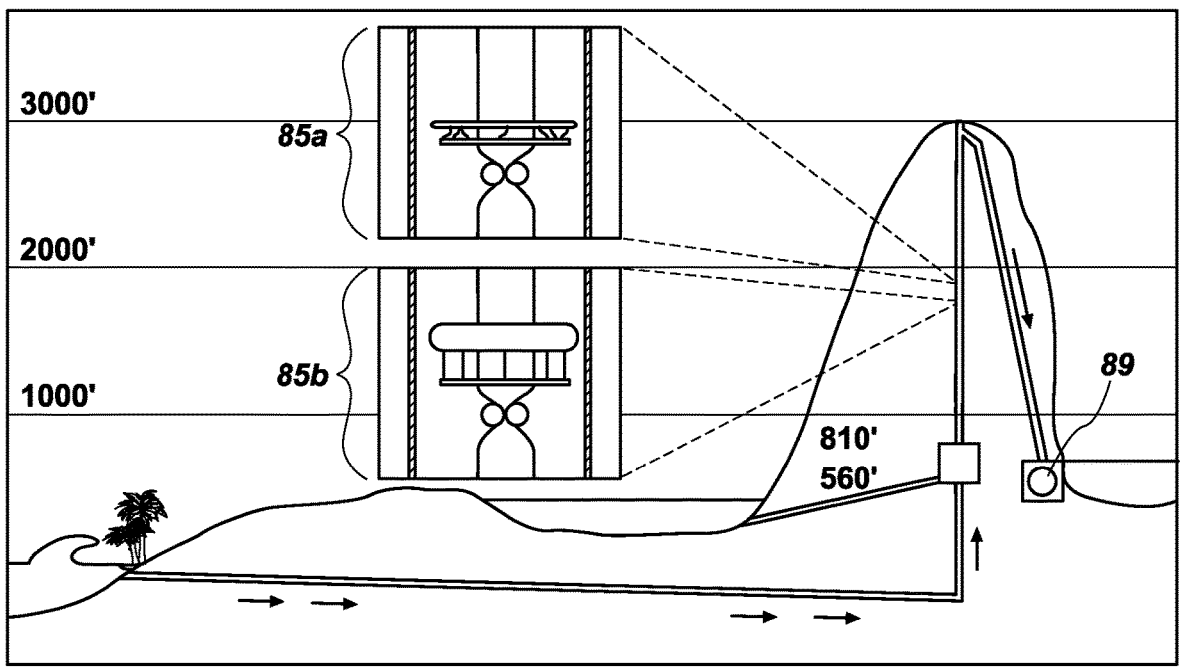
FIG. 27 is a side view of a schematic for an application of the water pumping system showing water being raised up a water column by a first water raising device to a second water-raising device.

Once the hose 15 is at the desired fullness, the lower water-raising device 85b begins to raise the water within the hose (FIG. 27). This is done by the roller clamps 33 moving from the open position to the closed position, and the buoyancy support 37 adjusting from a deflated configuration to an inflated configuration. As the buoyancy support 37 inflates, it raises the frame 80 and roller clamps 33. When the lower water-raising device 85b reaches the mid-point of the water column 20, it meets the upper water-raising device 85a. At this point, the upper water-raising device 85a is in the open configuration and ready to accept water from the lower water-raising device 85*b*.

Figure 28:
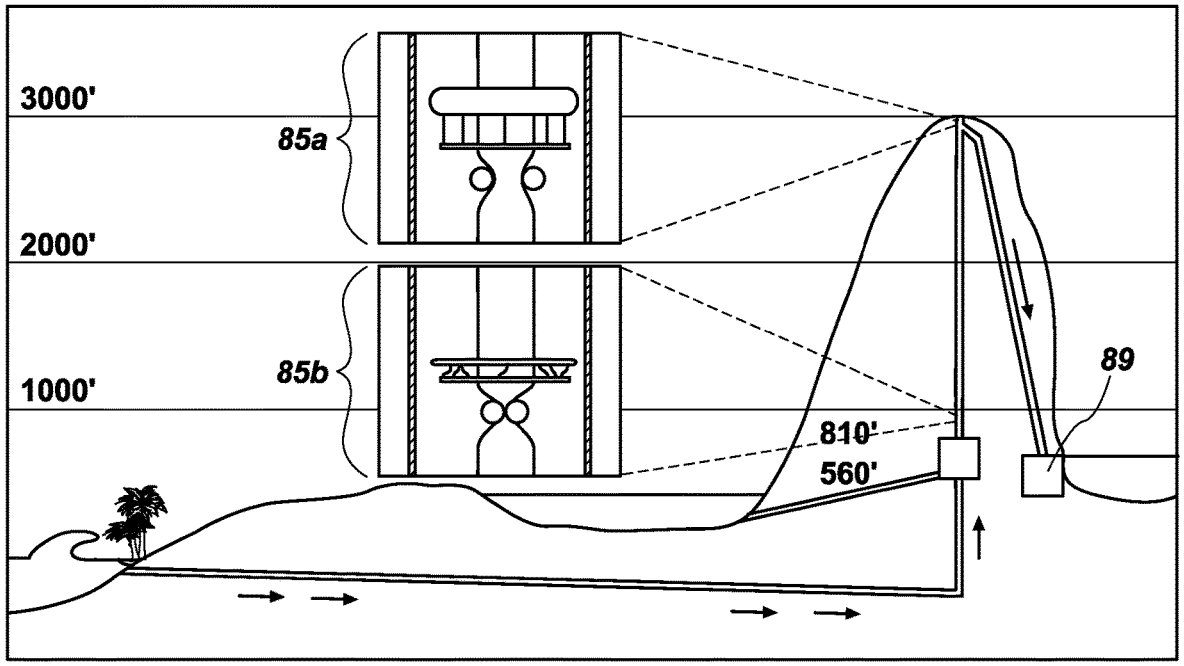
FIG. 28 is a side view of a schematic for an application of the water pumping system showing water being raised up by the second water-raising device of FIG. 27, while the first water raising device is lowered.
Figure 29:
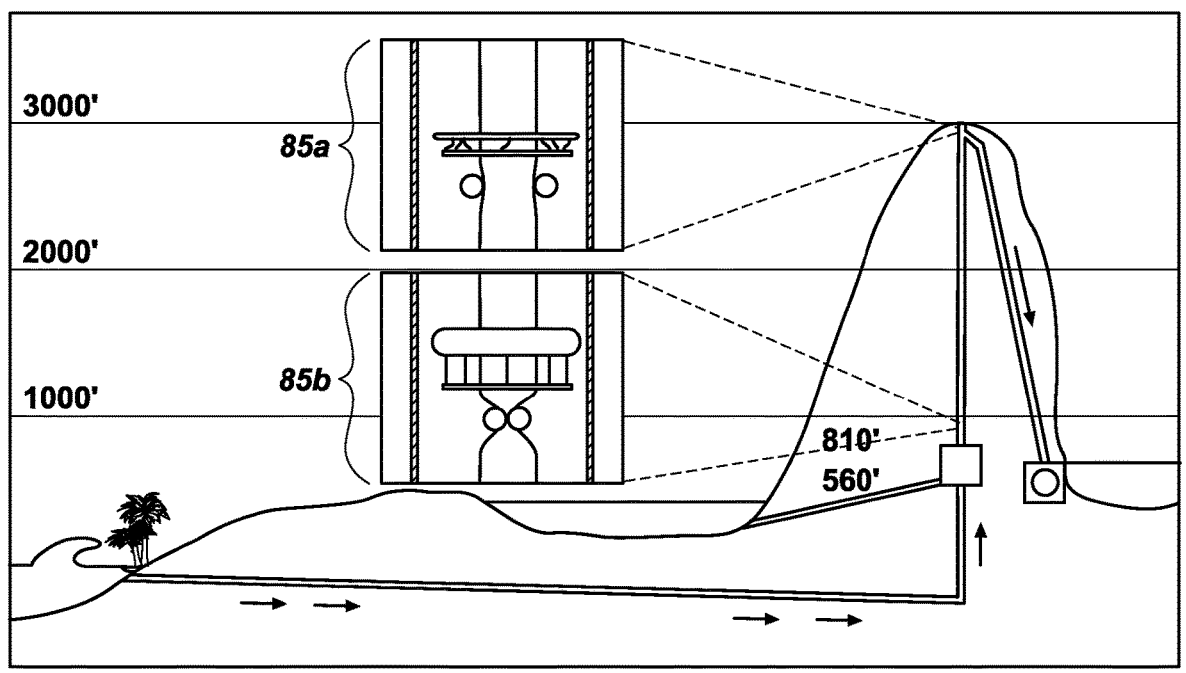
FIG. 29 is a side view of a schematic for an application of the water pumping system showing water being raised up by the first water raising device, while the second water-raising device is lowered to meet the first water raising device.

After the upper portion of the hose has been filled by the water raised by the lower water-raising device 85*b*, the upper water-raising device 85 then closes and begins to raise the water within the hose 15 to the top of the water column (FIG. 28). This is done by moving the clamps 33 of the upper water-raising device from the open position to the closed position, and inflating the buoyancy support 37 to raise the frame 80 and the attached roller clamps 33. As water reaches the top of the water column 20, it exits an effluent pipe 34. At the base of the effluent pipe 34, a reverse osmosis filter 89 can be provided. The water at the base of the effluent pipe 34 can have sufficient pressure to overcome the pressure needed to pass through the reverse osmosis filter 89.

In some examples, water spills or exits directly from the inner hose to the outer column 20. In other examples, water spills or exits through an effluent pipe that is near or slightly below the water level in the column 20. Water exiting through an effluent pipe can allow a reverse osmosis filter to be placed at any convenient location downstream, which can make access easier for maintenance and construction. Additionally, water to be desalinated can also pass through one or more pre-filters before it passes through the reverse osmosis filter.

Figure 30:
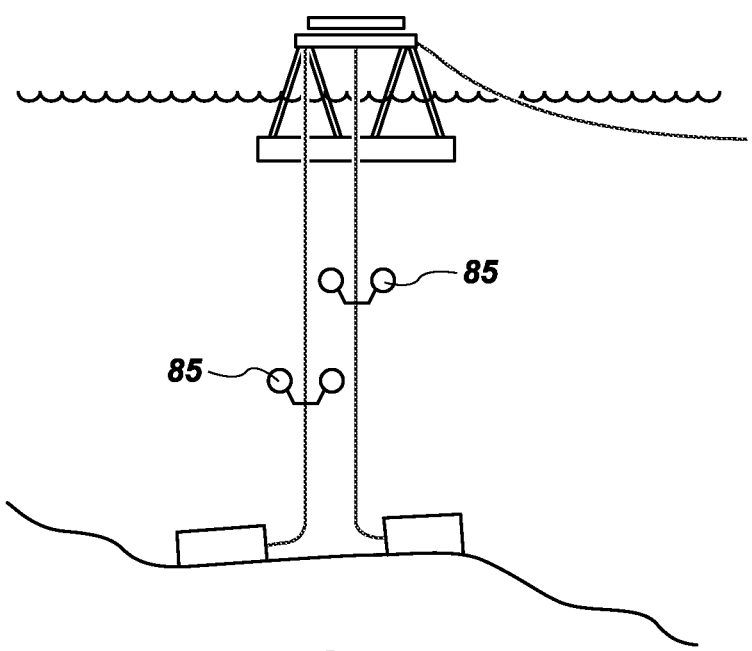
FIG. 30 is a side view of an exemplary application of a water pumping system in the ocean at the surface above desalination chambers underwater.
Figure 31:
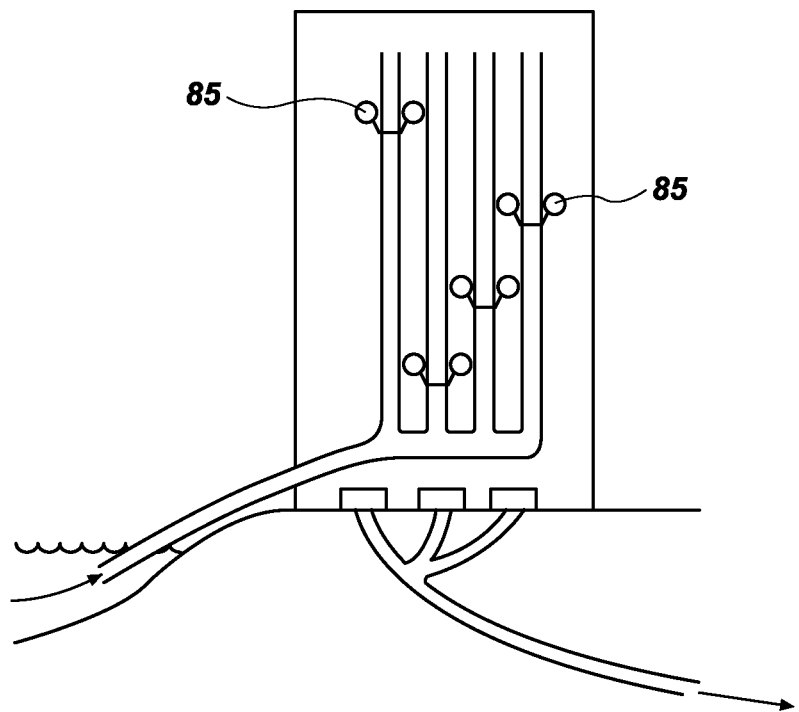
FIG. 31 is a side view of an exemplary freestanding tank in which contains water pumping systems and desalination chambers.
Figure 32:
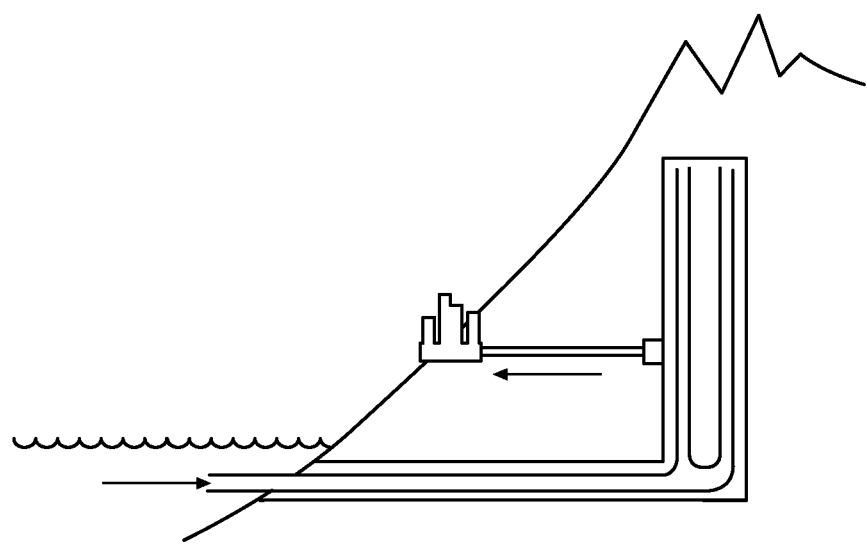
FIG. 32 is a side view of an exemplary application of a water pumping system using a column of water inside of a mountain surface.
Figure 33:
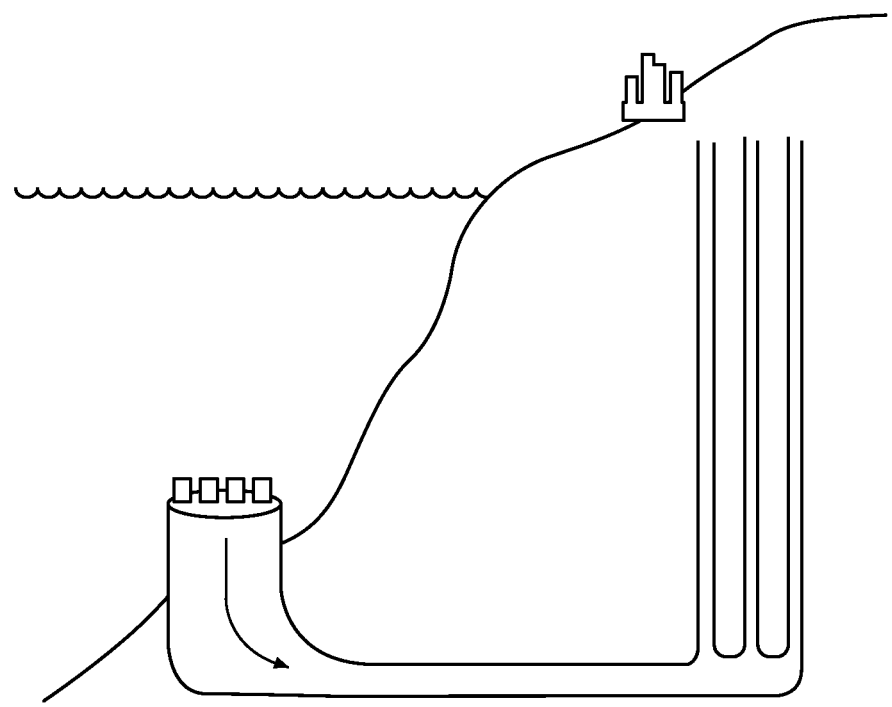
FIG. 33 is a side view of an exemplary application of a water pumping system using desalination chambers at the depth under seawater with fresh water raised underground to the surface.

Several applications of the water pumping systems described herein are possible, and the applications can be varied depending on access to salt water and geography. FIGS. 30-34 show various other examples of how water pumping systems described herein can be used in a wide variety of applications and settings. FIG. 30 shows an exemplary application of a water pumping system in the ocean at the surface above with desalination chambers underwater. FIG. 31 shows an exemplary freestanding tank in which contains water pumping systems and desalination chambers. FIG. 32 shows an exemplary application of a water pumping system using a column of water inside of a mountain surface, similar to FIGS. 25-29 above. FIG. 33 shows an exemplary application of a water pumping system using desalination chambers at the depth under seawater with fresh water raised underground to the surface using the water pumping systems described herein.

Figure 34:
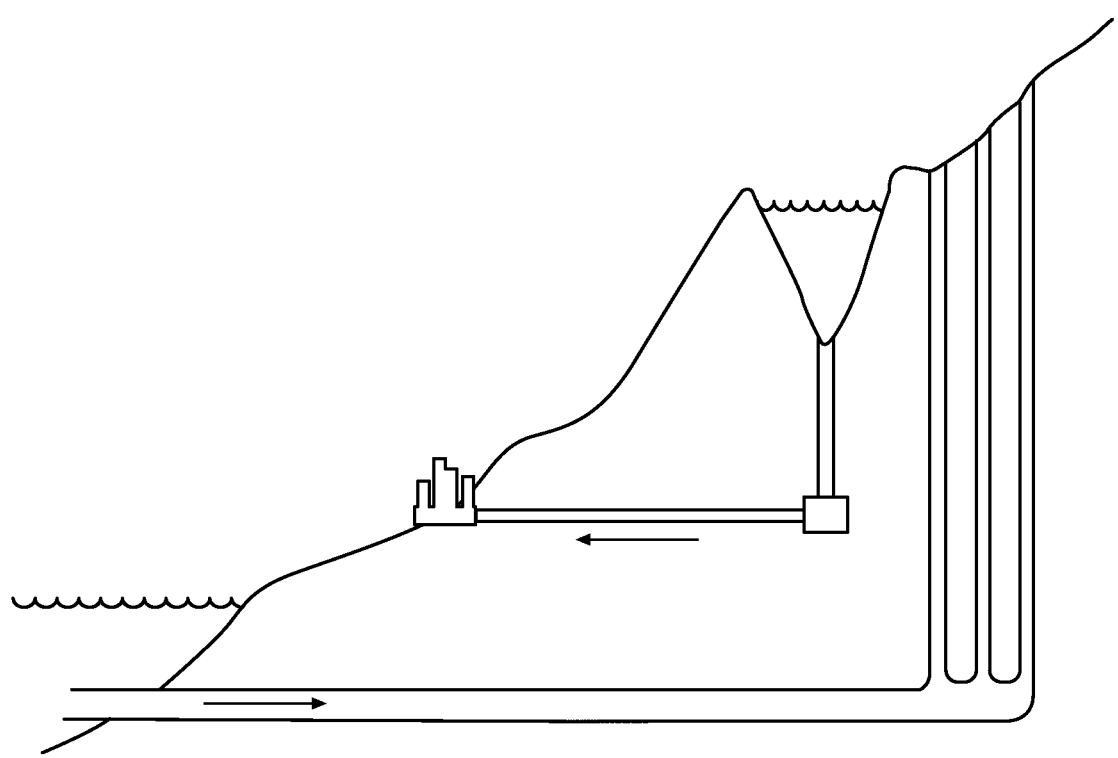
FIG. 34 is a side view of an exemplary application of a water pumping system that raises seawater to an artificial seawater reservoir.
Figure 35:
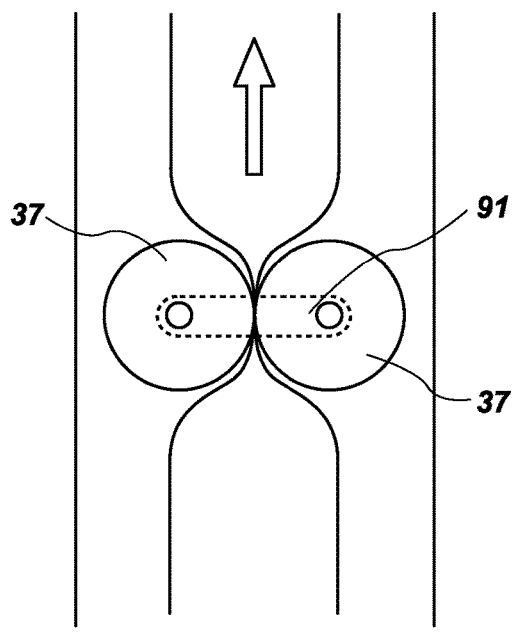
FIG. 35 is a side, partially cut-away view of another exemplary water pumping system in a clamped, rising position.
Figure 36:
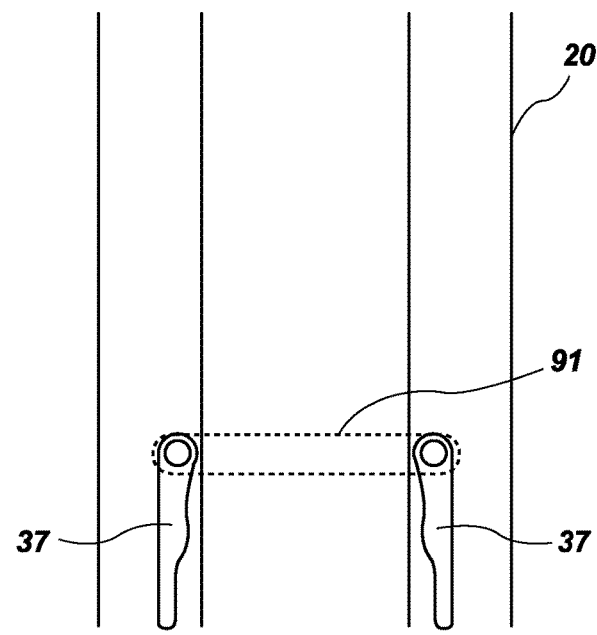
FIG. 36 is a side, partially cut-away view of the exemplary water pumping system of FIG. 35 in an open position.

FIG. 34 shows exemplary application of a water pumping system that raises seawater to an artificial seawater reservoir. The bottom of the reservoir contains desalination chambers. Or, the water can first pass through a reverse osmosis filter and then drop to a reservoir. In configurations where the water passes through the reverse osmosis membrane and still needs to fall an additional amount to reach a reservoir, it can also be possible to generate electricity using the potential energy of the water as it falls. There are also many options for use of saline after water passes through a reverse osmosis filter. For example, it can be returned to the sea, or harvested for salt and minerals.

FIGS. 35-38, alternate configurations of the system for moving water are disclosed. For example, in FIGS. 35-36, a roller clamp 33 is also the buoyancy support 37. That is, the clamp 33 and the buoyancy support 37 are integral. A frame 91 holds two selectively inflatable buoyancy supports 37 in close proximity. The frame 91 can have a width that is generally the same width as the hose 15, or slightly smaller or slightly larger. The width of the selectively inflatable buoyancy supports 37 may be about half the width of the frame, such that the inflatable buoyancy supports touch when they are in the inflated position. As the selectively inflatable buoyancy supports 37 are inflated (FIG. 35), they both rise and also clamp against the hose 15. As the buoyancy supports 37 are deflated (FIG. 36), the inner hose 15 can again fill with water.

Figure 37:
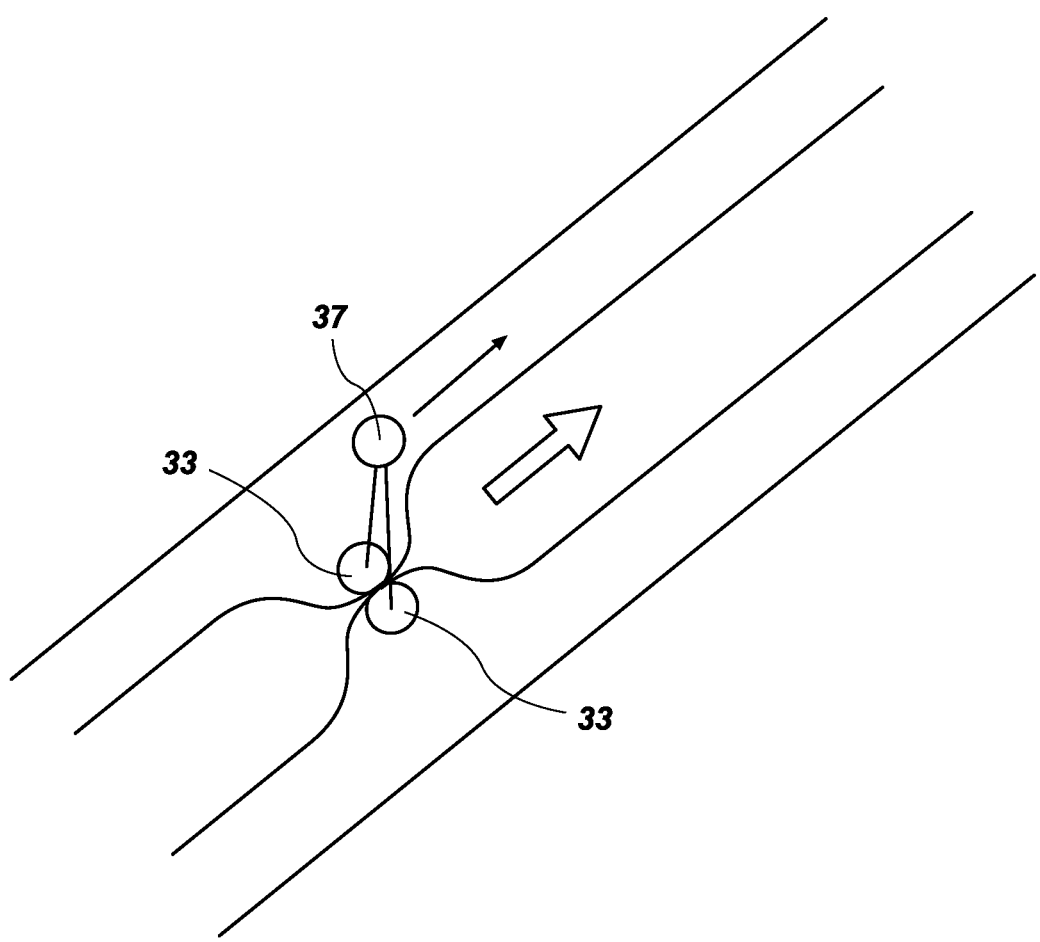
FIG. 37 is a side, partially cut-away view of another exemplary water pumping system in a clamped, rising position.
Figure 38:
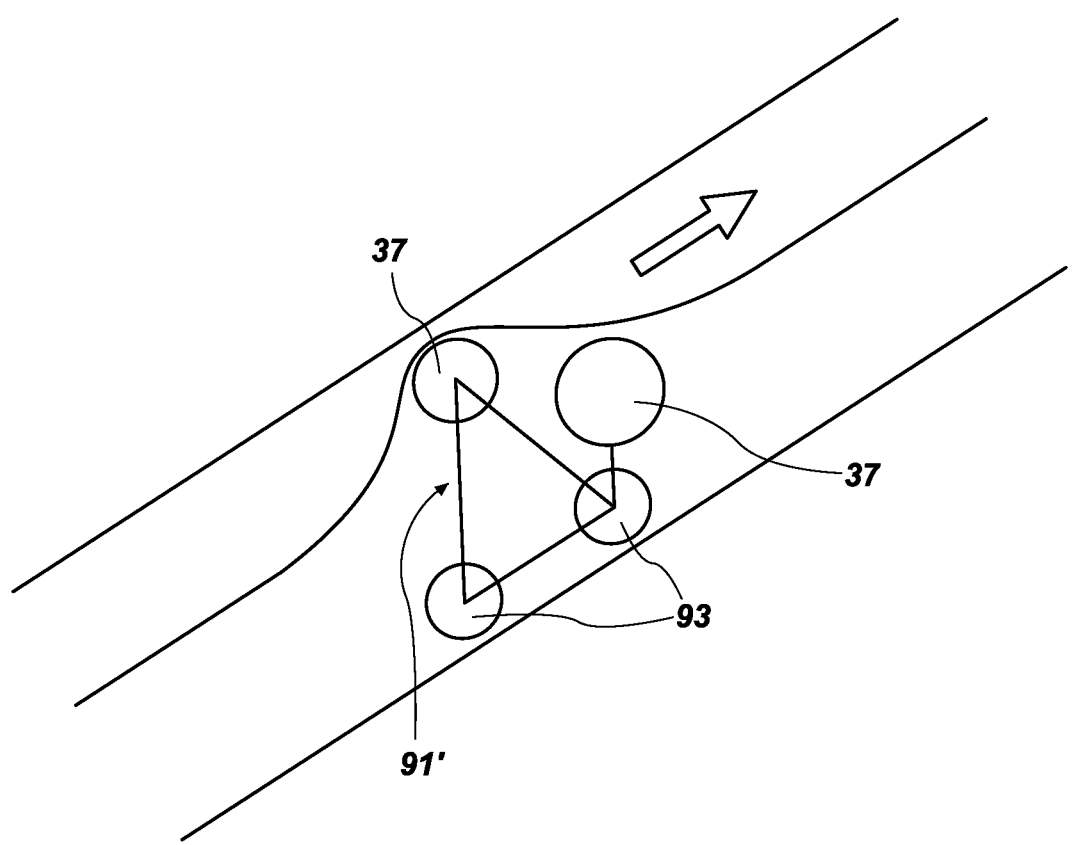
FIG. 38 is a side, partially cut-away view of another exemplary water pumping system in a clamped, rising position.

FIGS. 37-38 show alternate configurations for moving water up a column which is not exactly vertical, but is generally vertical. As seen in FIG. 37, the column 20 has a generally sloped, upward rise. As the buoyancy device 37 (or other method of causing water to rise, such as any of the methods described above), tries to rise in the most vertical direction, it will also move horizontally along the column 20 to rise vertically. The clamps 33 can be any of the clamps as described above, or can be buoyancy clamps shown in FIGS. 35-36.

FIG. 38 shows another example of a generally vertical or sloped column 20. In this exemplary configuration, the hose 15 is positioned towards one side of the rigid outer column 20. On the side opposite of the hose 15, a rigid frame 91' is connected to one or more rollers 93 that move along the column 20. A selectively inflatable and/or retractable compression device 95 is also attached to the rigid frame 91' to compress the hose 15. A buoyancy support 37 is connected to the frame 91' and can be selectively inflated to cause the frame and connected compression device 95 to move up the column 20.

Figure 39:
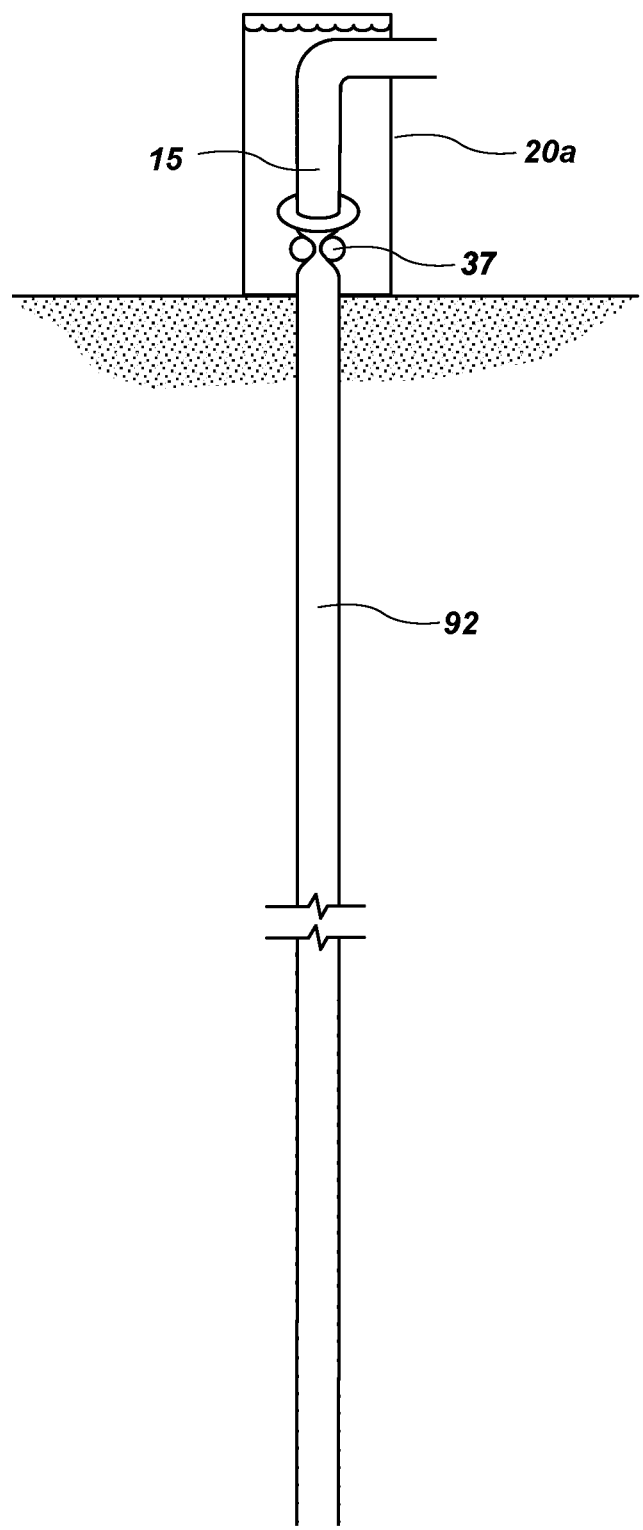
FIG. 39 is a partial cut-away view of an embodiment of another water pumping system.

FIG. 39 shows another example of a system that can be used above ground, with the roller clamp and buoyancy apparatus 37 located within an above-ground water reservoir 20*a*. The water reservoir is above a rigid pipe 92, with the rigid pipe in connection with a deformable hose 15 located inside the water reservoir. The rigid pipe may be located, for example, below ground. One or more other aspects described above, such as various types of buoyancy systems, one-way valves, etc., can also be used in combination with this system. In this system, the rigid pipe located underground may be primed to further drive water upward. For example, an electric pump or traditional water pipe may be used to prime the rigid pipe located underground.

Figure 40:
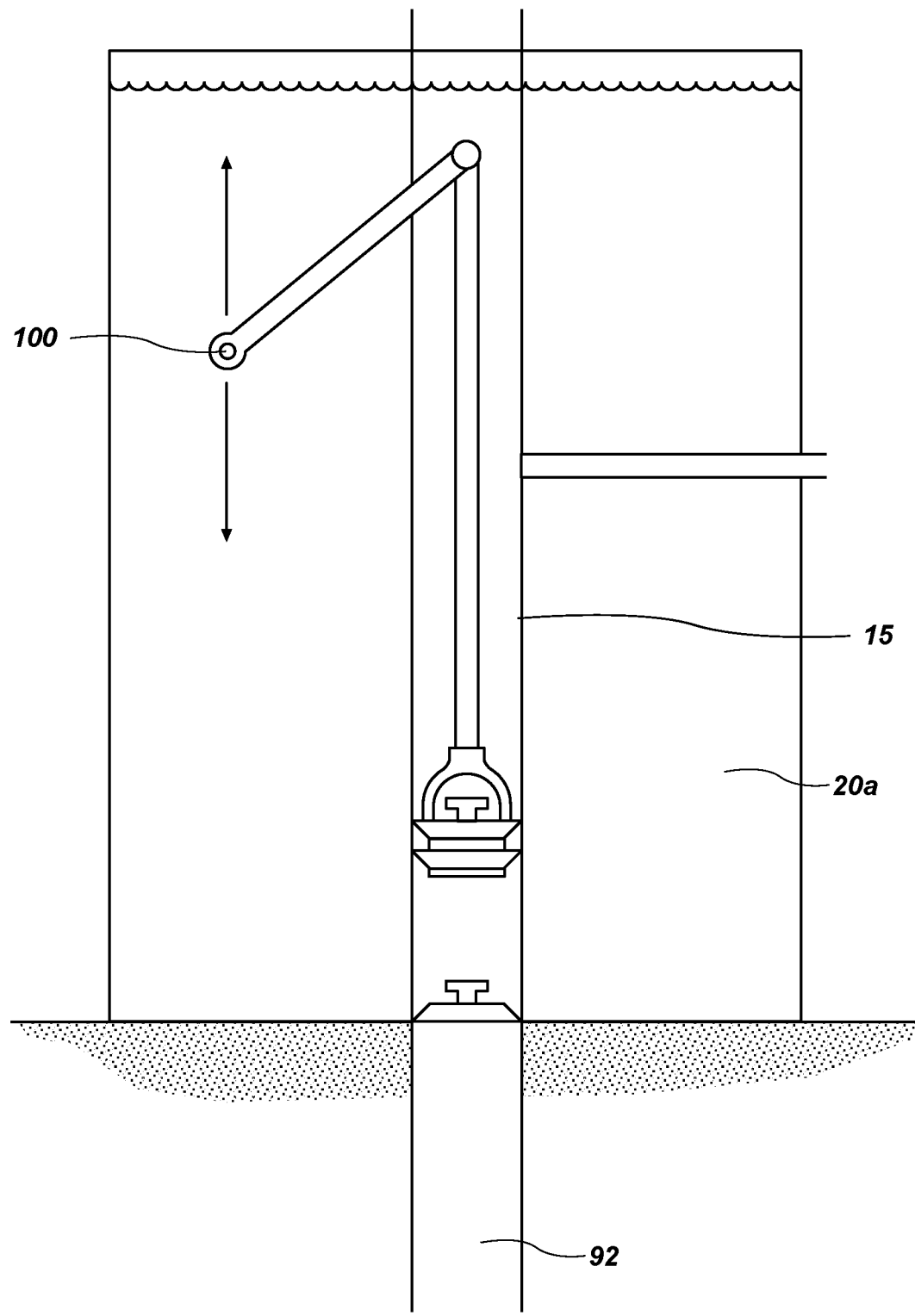
FIG. 40 is a partial cut-away view of an embodiment of another water pumping system that includes a lever pump.

FIG. 40 shows another example of a system that can be used above ground. In this system, a below-ground or generally below-ground rigid pipe 92 is in connection with a hose 15 (either a deformable hose or a rigid hose) located inside an above-ground a water reservoir 20*a*, similar to the system shown in FIG. 39. But rather than a roller clamp attached to a buoyancy bag, a clamp is raised and lowered along the deformable hose using a lever-driven piston. This can be a piston pump, a plunger pump, etc. The pump is driven by one or more buoyancy bags which are attached to the handle 100 of the pump and located within the water in the water reservoir 20*a*. The handle 100 moves in the directions indicated by the arrows in FIG. 40.

FIGS. 41-47 illustrate an exemplary system that uses a bolus pumping, or alternating flaccid and rigid hose 15*a*. The expanding of the alternating flaccid and rigid hose can be accomplished by any suitable means, such as air, water, mechanical expansion, hydraulic fluid, electroshapable materials, magnetorheological fluid, electrorheological fluid, smart fabrics, etc., and all are contemplated. Those with skill in the art of materials engineering will understand that the disclosure is not limited to a particular method of accomplishing an alternating flaccid and rigid hose. The hose 15*a* generally includes an inner lumen 60*a* and one or more segments that are selectively inflatable and deflatable that are in communication with the inner lumen 60*a*. Inflating and deflating the segments causes the volume of the inner lumen 60*a* to change.

Figure 41:
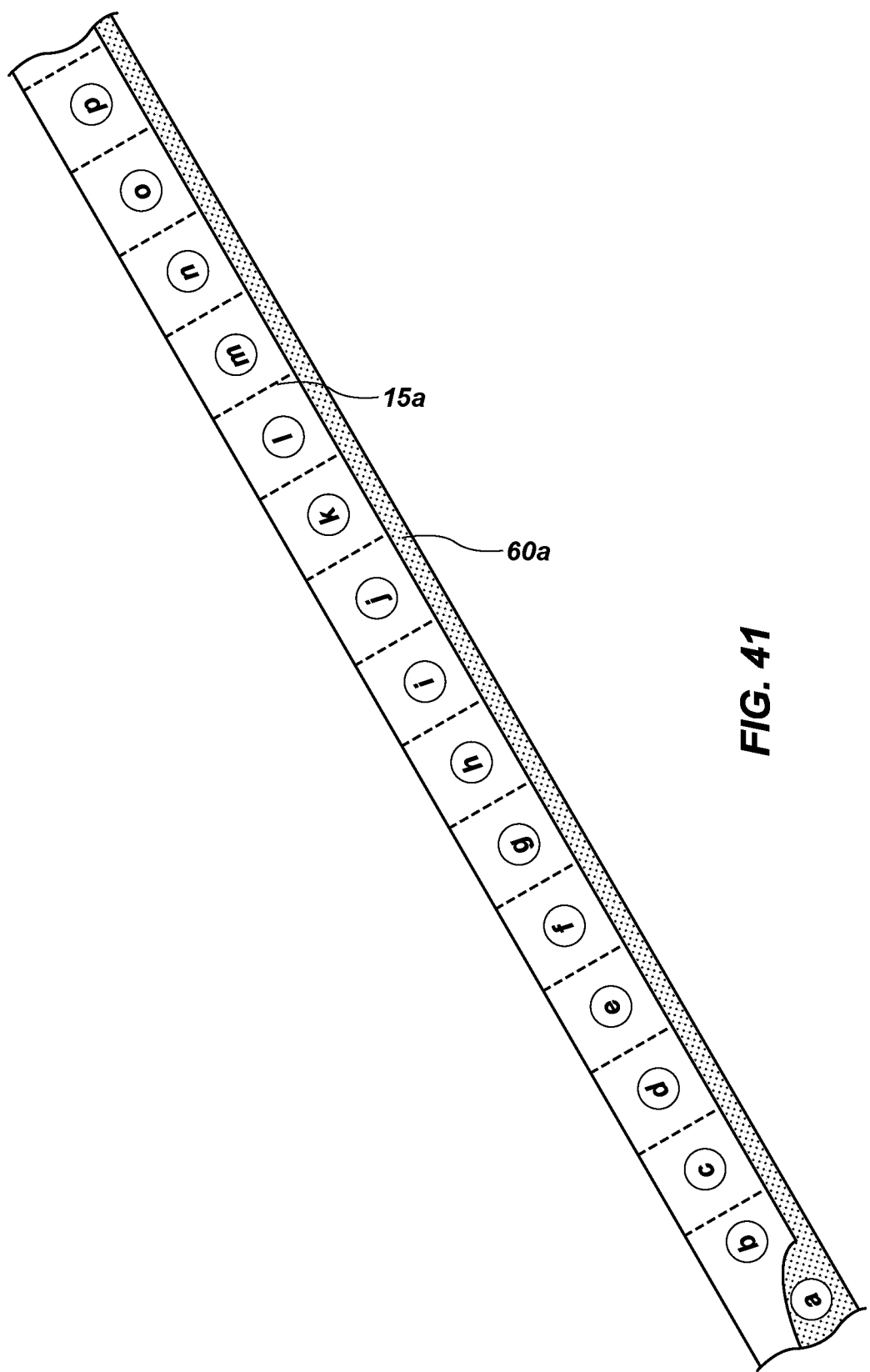

FIGS. 41-47 illustrate how water can be driven upwards in a hose 15*a* by creating a peristaltic motion by selectively inflating and deflating chambers (labeled a-p, successively, in FIG. 41) within the hose 15a. FIG. 41 illustrates a hose 15a that has section a deflated. Water is in both the outer lumen and the inner lumen, or in other words, water is present inside the hose and also outside the hose creating pressure on the hose. Outside the hose 15a, the water level is above the level of discharge for the water from inside the hose 15a. Each segment of the hose 15a is able to be independently inflated and deflated (by any suitable means, as discussed above). As segment a is deflated, water enters segment a.

Figure 42:
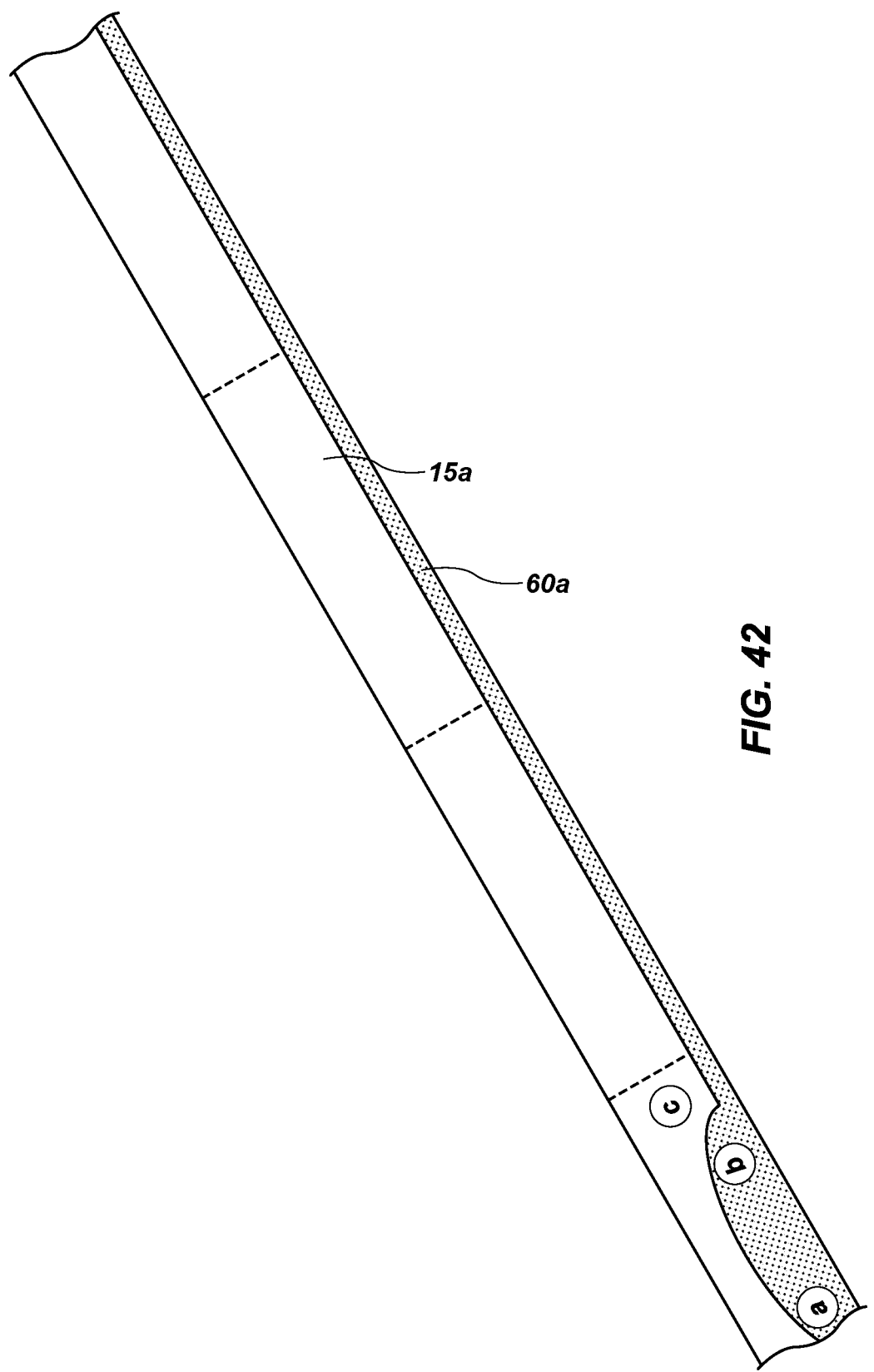

FIG. 42 illustrates the hose of FIG. 41, now with segment b deflated. As segment b deflates, water moves upwardly from segment a to segment b. Water pressure at segment b is higher outside the hose 15a than inside the hose 15a. Therefore water pressure at segment b is greater outside the hose than the pressure inside the hose 15a in segment c, and water will move upward towards the next successive segment.

Figure 43:
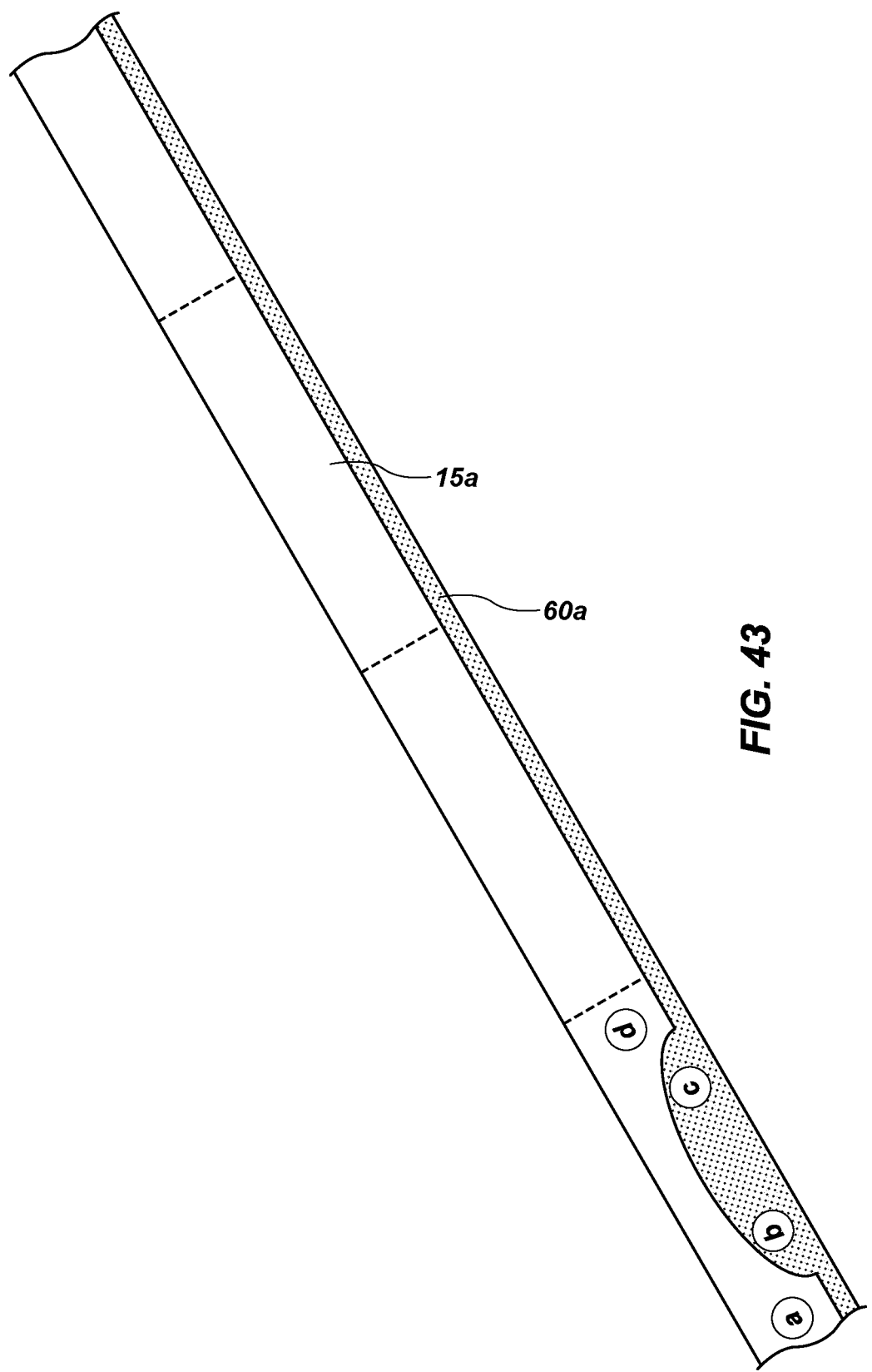

FIG. 43 shows that now segment c has been deflated, with segment a re-inflated. Water that had filled segments a and b now moves into segment c. As a segment re-inflates, it draws water from below the segment. In the case of segment a, segment a may be below sea level, or the pressure below segment a is at least greater than the relative negative pressure created by the inflation of segment a.

Figure 44:
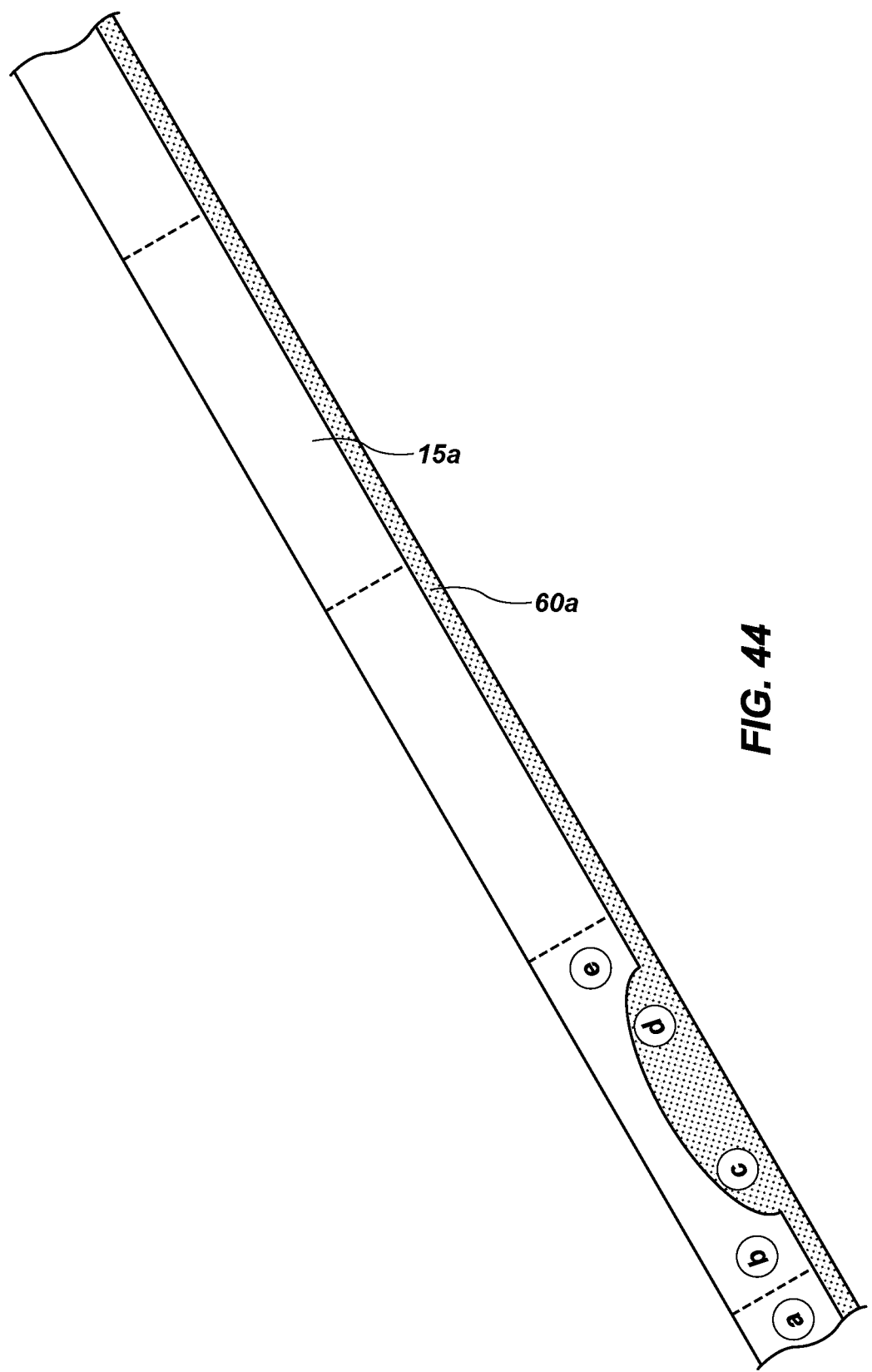

FIG. 44 shows that segment d is now deflated, allowing water to flow upward from segment c into segment d (and water from segment b into segment c). Segment b is also re-inflated, pushing water upwardly from segment b into segment c.

Figure 45:
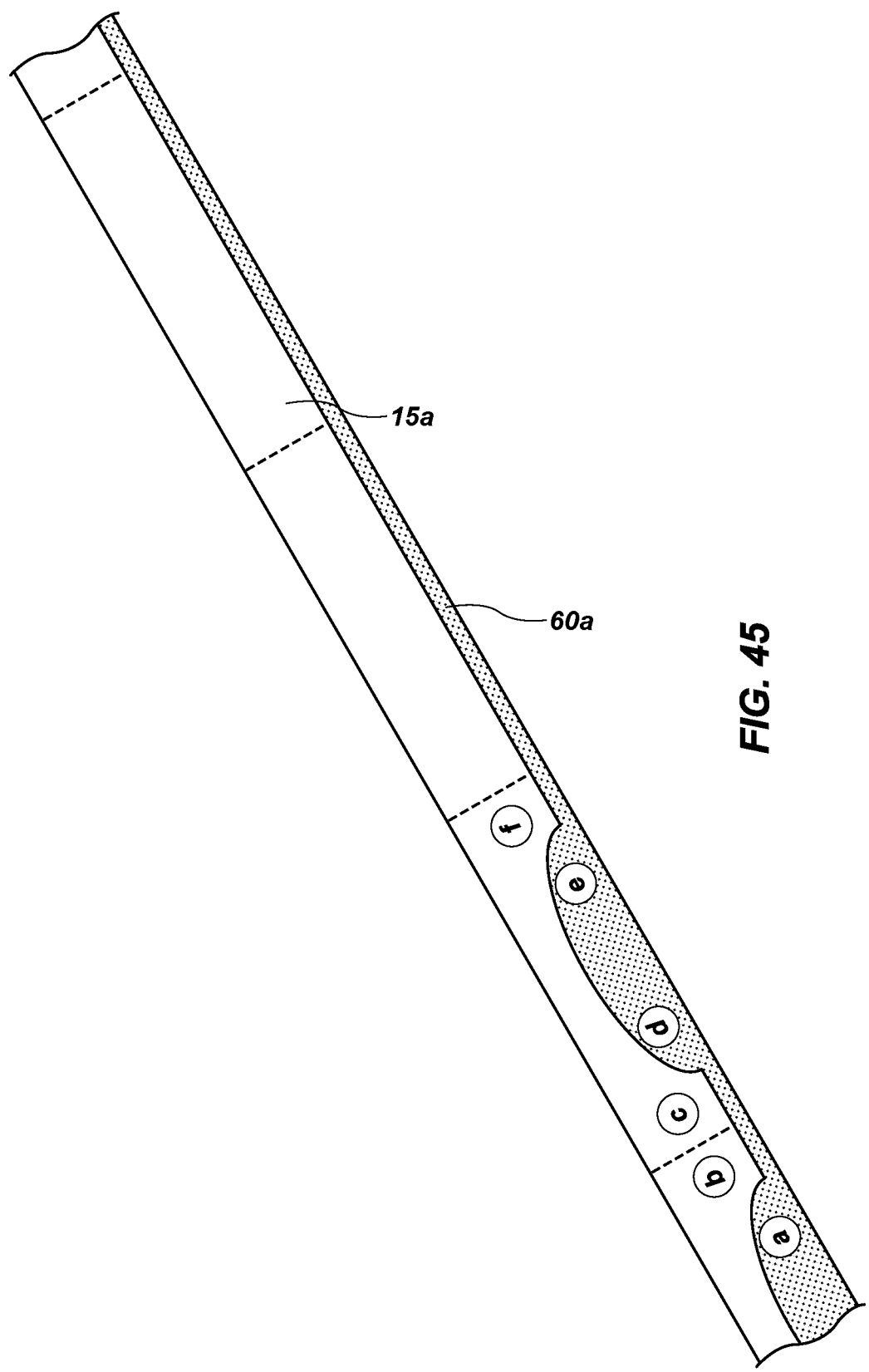

FIG. 45 shows segment e now deflated, allowing water to flow upward from segment d into segment e. Segment c is also re-inflated, pushing water upwardly from segment c into segment d.

Figure 46:
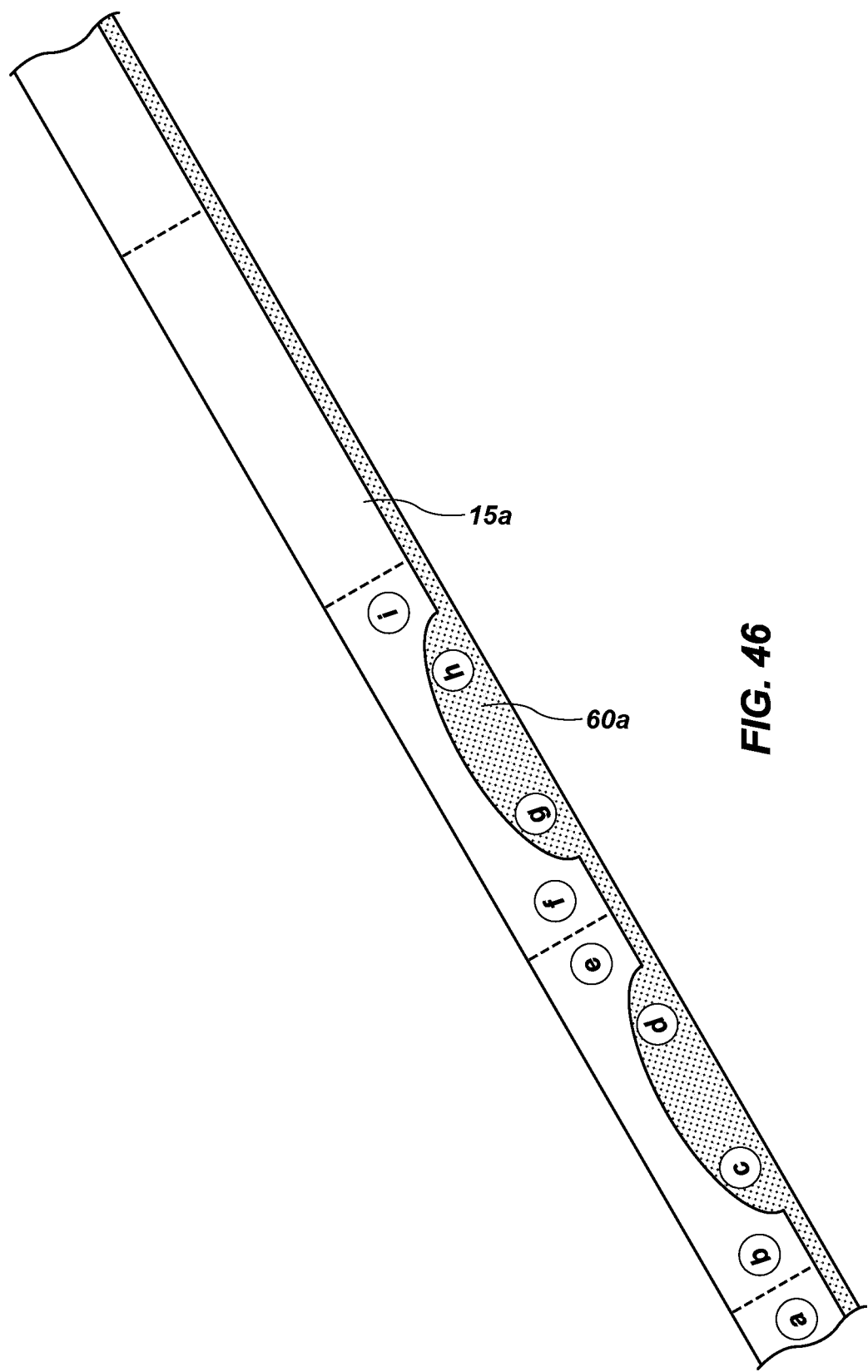

FIG. 46 shows segments g and h, and c and d deflated, with segments a and b, and e and f, re-inflated. Boluses of water thus travel upwardly along the hose 15a as the segments alternatively inflate and deflated.

FIG. 47 shows segments a, d and e, and h and i deflated, with segments b and c, and f and g, re-inflated. The boluses of water continue to travel upwardly along the hose 15a until they reach the outlet of the hose (which is below the water level of the water outside hose 15a).

The figures show two or more boluses of water traveling up the hose 15a, with two or more segments of the hose 15a being selectively inflated and/or deflated in conjunction. In some embodiments, one segment of the hose 15a is selectively inflated and/or deflated, two segments of the hose 15a are selectively inflated and/or deflated in conjunction, three or more segments may be inflated and/or deflated in conjunction, or any number of segments may be inflated and deflated to achieve the desired movement of water upwardly in the hose 15a.

The description is only exemplary of the principles of the disclosure, and should not be viewed as narrowing the scope of the claims which follow, which claims define the full scope of the invention. Various aspects discussed in one drawing may be present and/or used in conjunction with the embodiment shown in another drawing, and each element shown in multiple drawings may be discussed only once. The described features, structures, or characteristics of configurations of the disclosure may be combined in any suitable manner in one or more configurations. In some cases, detailed description of well-known items or repeated description of substantially the same configurations may be omitted to facilitate the understanding of those skilled in the art by avoiding an unnecessarily redundant description. All statements herein reciting principles, aspects, and embodiments of the invention, as well as specific examples thereof, are intended to encompass equivalents thereof.

Reference in the specification to "one configuration" "one embodiment," "a configuration" "an example," or "an embodiment" means that a particular feature, structure, or characteristic described in connection with the configuration is included in at least one configuration, but is not a requirement that such feature, structure or characteristic be present in any particular configuration unless expressly set forth in the claims as being present. The appearances of the phrase "in one configuration" or "in one example" in various places may not necessarily limit the inclusion of a particular element of the disclosure to a single configuration, rather the element may be included in other or all configurations discussed herein.

As used in this specification and the appended claims, singular forms such as "a," "an," and "the" may include the plural unless the context clearly dictates otherwise. Thus, for example, reference to "a clamp" may include one or more of such clamps, and reference to "the buoyancy support" may include reference to one or more of such supports.

As used herein, the term "generally" refers to something that is more of the designated adjective than not, or the converse if used in the negative. As used herein, the term "about" is used to provide flexibility to a numerical range endpoint by providing that a given value may be "a little above" or "a little below" the endpoint while still accomplishing the function associated with the range, for example, "about" may be within 10% of the given number or given range. As used herein, a plurality of items, structural elements, compositional elements, and/or materials may be presented in a common list for convenience. However, these lists should be construed as though each member of the list is individually identified as a separate and unique member.

Numerical data may be expressed in a range format. This range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. For example, a numerical range of "about 5 to about 60" should be interpreted to include not only the explicitly recited values of about 1 to about 5, but also include individual values and sub-ranges within the indicated range. Thus, included in this numerical range are individual values such as 6, 7, 8, 9, etc., through 60, and sub-ranges such as from 10-20, from 30-40, and from 50-60, etc., as well as each number individually. This same principle applies to ranges reciting only one numerical value as a minimum or a maximum. Furthermore, such an interpretation should apply regardless of the breadth of the range or the characteristics being described.

While methods are described herein in discrete steps in a particular order for the sake of clarity, the steps do not require a particular order and more than one step may be performed at the same time. For example, a later step may begin before earlier step completes. Or, a later step may be completed before an earlier step is started. Additionally, the word "connected" and "coupled" is used throughout for clarity of the description and can include either a direct connection or an indirect connection.

Although the foregoing disclosure provides many specifics, such as use of the system in pumping water, it will be appreciated that other applications are contemplated and these should not be construed as limiting the scope of any of the ensuing claims. For example, the system can be used to move water vertically or generally vertically or even horizontally. The system can also be used to move fluids other than water, or to move fresh water. Other applications could include using the pumping system to raise water out of an aquafer. Other embodiments and configurations may be devised which do not depart from the scopes of the claims. Features from different embodiments and configurations may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

Furthermore, if any references have been made to patents and printed publications throughout this disclosure, each of these references and printed publications are individually incorporated herein by reference in their entirety.

The invention claimed is:

1. A method for pumping a liquid, the method comprising:
providing a rigid outer column for receiving the liquid;
providing an inner, deformable hose within the rigid outer column, the inner, deformable hose having a distal end with a one-way valve to allow the liquid to enter the distal end of the inner, deformable hose, and the inner, deformable hose having a proximal end with a one-way valve to allow the liquid to exit the proximal end of the inner, deformable hose;
wherein the inner, deformable hose has an inner lumen and two or more selectively inflatable segments:
positioning the inner, positioning the inner, deformable hose into a first, rigid configuration to allow the inner, deformable hose to fill with the liquid:
after the inner, deformable hose has filled with the liquid positioning the inner, deformable hose into a second, flaccid configuration to allow the liquid to exit the proximal end of the inner deformable hose;
providing a liquid-raising device for raising liquid within the inner, deformable hose, the liquid-raising device comprising at least one compression device to electively close the inner, deformable hose and move along the inner, deformable hose;
providing a selectively inflatable buoyancy support attached to the liquid-raising device, and wherein the method further comprises selectively inflating the selectively inflatable buoyancy support to raise the at least one compression device along the inner, deformable hose.

2. The method of claim 1, wherein the at least one compression device comprises two roller clamps.

3. The method of claim 1, wherein the inner, deformable hose has a first segment, a second segment, and a third segment.

4. The method of claim 3 wherein the inner, deformable hose has a first position with the first segment selectively deflated and one or more of the second and third segments selectively deflated.

5. The method of claim 3, wherein the inner, deformable hose comprises one or more selectively fillable water channels and wherein inflating the first segment is achieved by filling selectively fillable water channels and wherein deflating the first segment is achieved by removing water from the selectively fillable water channels.

6. The method of claim 3, wherein the inner, deformable hose is formed of both resilient and flexible material.

7. The method of claim 1, wherein the one-way valve to allow water to exit the inner, deformable hose comprises an effluent pipe.

8. The method of claim 7, wherein the effluent pipe is in fluid communication with a reverse osmosis water filter.

9. The method of claim 1, wherein the inner lumen for moving water upwardly within the inner lumen raises the water to a predetermined height, and wherein the predetermined height of the water creates a water column to be filtered with the predetermined height, the water column to be filtered having sufficient pressure at a bottom of the water column to be filtered to overcome a reverse osmosis filter.

* * * * *